United States Patent
Greinhofer et al.

(10) Patent No.: US 9,654,436 B2
(45) Date of Patent: May 16, 2017

(54) SYSTEMS AND METHODS FOR MIGRATING MAILBOX DATA FROM SYSTEMS WITH LIMITED OR RESTRICTED REMOTE ACCESS

(71) Applicant: BitTitan Inc., Kirkland, WA (US)

(72) Inventors: Rémy Greinhofer, Bellevue, WA (US); Guillaume Zurbach, Seattle, WA (US); Geeman Yip, Kirkland, WA (US); Dominic J. Pouzin, Sammamish, WA (US)

(73) Assignee: BITTITAN INC., Kirkland, WA (US)

( * ) Notice: Subject to any disclaimer, the term of this patent is extended or adjusted under 35 U.S.C. 154(b) by 55 days.

(21) Appl. No.: 13/686,637

(22) Filed: Nov. 27, 2012

(65) Prior Publication Data

US 2014/0149517 A1    May 29, 2014

(51) Int. Cl.
  *G06F 15/16*  (2006.01)
  *H04L 12/58*  (2006.01)
(52) U.S. Cl.
  CPC .................. *H04L 51/22* (2013.01)
(58) Field of Classification Search
  CPC ..... G06F 3/0647; G06F 9/5088; G06F 17/303
  USPC ................ 709/206, 204, 223–225, 227, 229
  See application file for complete search history.

(56) References Cited

U.S. PATENT DOCUMENTS

| | | | |
|---|---|---|---|
| 5,915,004 A * | 6/1999 | Pabbati et al. | 379/100.08 |
| 6,208,717 B1 * | 3/2001 | Yeh et al. | 379/88.18 |
| 6,502,191 B1 * | 12/2002 | Smith et al. | 726/12 |
| 6,735,691 B1 | 5/2004 | Capps et al. | |
| 7,313,560 B2 | 12/2007 | Dilley, Jr. et al. | |
| 7,320,068 B2 | 1/2008 | Zimniewicz et al. | |
| 7,493,394 B2 * | 2/2009 | Zavalkovsky et al. | 709/225 |
| 7,577,805 B2 | 8/2009 | Amano et al. | |
| 7,710,874 B2 * | 5/2010 | Balakrishnan et al. | 370/235 |
| 8,250,215 B2 | 8/2012 | Stienhans et al. | |
| 8,272,031 B2 * | 9/2012 | Abderrazzaq | H04L 63/0227 726/1 |
| 8,285,817 B1 * | 10/2012 | Balasubramanian | G06F 17/30079 709/219 |

(Continued)

OTHER PUBLICATIONS

SBS Bloggers, "The Windows Server Essentials and Small Business Blog—SBS 2008—How to Export and Import Mailboxes to and From PST", SBS 2008, Jan. 13, 2009.

(Continued)

*Primary Examiner* — Liangche A Wang
*Assistant Examiner* — Kaylee Huang
(74) *Attorney, Agent, or Firm* — Dorsey & Whitney LLP

(57) ABSTRACT

Examples described include software hosting systems able to provide software as a service to client systems through a firewall and/or to client systems which do not have web service capability. Examples include mailbox migration systems for migrating mailboxes from a source messaging system (e.g. a Lotus Notes system) to a destination messaging system. Software hosting systems described herein may maintain an action buffer including a next action to be performed by the source messaging system, and wait for data (e.g. messaging system content) to be returned and stored in a data buffer. Communication between the software hosting system and the source messaging system may occur over a communication channel which may be operated through a firewall using HTTP.

24 Claims, 9 Drawing Sheets

(56) References Cited

U.S. PATENT DOCUMENTS

| | | | |
|---|---|---|---|
| 8,307,362 | B1 | 11/2012 | Gong et al. |
| 8,849,955 | B2 | 9/2014 | Prahlad et al. |
| 8,938,510 | B2 | 1/2015 | Pouzin et al. |
| 9,367,577 | B2 | 6/2016 | Lee et al. |
| 2002/0112007 | A1* | 8/2002 | Wood et al. ............... 709/206 |
| 2002/0169907 | A1 | 11/2002 | Candea et al. |
| 2004/0073639 | A1 | 4/2004 | Basoglu et al. |
| 2004/0146147 | A1* | 7/2004 | Picard et al. ............. 379/88.22 |
| 2004/0215709 | A1 | 10/2004 | Basani et al. |
| 2004/0267890 | A1 | 12/2004 | Soulet |
| 2005/0164703 | A1 | 7/2005 | Huynh |
| 2005/0246518 | A1 | 11/2005 | Takahashi |
| 2005/0267938 | A1 | 12/2005 | Czeczulin |
| 2006/0173908 | A1 | 8/2006 | Browning et al. |
| 2006/0190493 | A1 | 8/2006 | Kawai et al. |
| 2007/0073573 | A1 | 3/2007 | Gerhard et al. |
| 2007/0073818 | A1 | 3/2007 | Gardner et al. |
| 2008/0028100 | A1 | 1/2008 | Adelman et al. |
| 2008/0109448 | A1 | 5/2008 | Aboel-Nil et al. |
| 2008/0243930 | A1 | 10/2008 | Browning et al. |
| 2009/0144743 | A1 | 6/2009 | Wolslegel |
| 2009/0187632 | A1* | 7/2009 | Alarid ............... G06Q 10/107 709/206 |
| 2009/0276771 | A1 | 11/2009 | Nickolov et al. |
| 2010/0011033 | A1 | 1/2010 | Czeczulin |
| 2010/0036923 | A1* | 2/2010 | Byrne ............... G06Q 10/107 709/206 |
| 2010/0076933 | A1 | 3/2010 | Hamilton et al. |
| 2010/0131948 | A1 | 5/2010 | Ferris |
| 2010/0191868 | A1 | 7/2010 | Pappu et al. |
| 2010/0332401 | A1 | 12/2010 | Prahlad et al. |
| 2010/0333116 | A1 | 12/2010 | Prahlad et al. |
| 2011/0004629 | A1 | 1/2011 | Thorat et al. |
| 2011/0035376 | A1 | 2/2011 | Kirshenbaum et al. |
| 2011/0055712 | A1 | 3/2011 | Tung et al. |
| 2011/0142064 | A1 | 6/2011 | Dubal et al. |
| 2011/0145392 | A1 | 6/2011 | Dawson et al. |
| 2011/0178831 | A1 | 7/2011 | Ravichandran |
| 2011/0225209 | A1 | 9/2011 | Volvovski et al. |
| 2011/0264748 | A1* | 10/2011 | Pouzin et al. ............ 709/206 |
| 2013/0205109 | A1 | 8/2013 | Benhase et al. |
| 2013/0346513 | A1* | 12/2013 | Jia et al. .................. 709/206 |
| 2014/0115335 | A1* | 4/2014 | Jorden et al. ............ 713/169 |
| 2015/0100655 | A1 | 4/2015 | Pouzin et al. |
| 2016/0253339 | A1 | 9/2016 | Ambrose et al. |

OTHER PUBLICATIONS

"Data Migration Assistant User Guide Release 6.1(3)", Cisco Systems, Inc., 2008, 1-38.
Dasgupta, Koustuv et al., "QoSMig: Adaptice Rate-Controlled Migration of Bulk Data in Storage Systems", Data Engineering, 2005. ICDE 2005. Proceedings 21st International Conference on Apr. 5-8, 2005, 816-827.
Karagiannis, Thomas, "Hermes: Clustering Users in Large-Scale E-mail Services", SoCC'10, Jun. 10-11, 2010, 1-12.
Lu, Chenyang et al., "Aqueduct: online data migration with performance guarantees", Conference on File and Storage Technologies (FAST'02), Jan. 28-30, 2002, 219-230.
Pick, Gershon, "Data Migration Concepts & Challenges", Retrieved Feb. 26 from http://www.aymgael.com/pdf% 20reports/Data% 20Migration% 20Concepts% 20&%20Challenges.pdf, 2001, 1-15.
Ranjan, S et al., "QoS-Driven Server Migration for Internet Data Centers", Quality of Service, 2002. Tenth IEEE International Workshop on, 2002, 3-12.
Stacey, Craig et al., "The Water Fountain vs. The Fire Hose: An Examination and Comparison of Two Large Enterprise Mail Service Migrations", LISA '09: 23rd Large Installation System Administration Conference, Nov. 1-6, 2009, 29-46.
Stage, Alexander et al., "Network-aware migration and scheduling of differentiated virtual machine workloads", ICSE'09 Workshop (Cloud'09), May 23, 2009, 1-6.
Strodl, Stephan et al., "Automating Logical Preservation for Small Institutions with Hoppla", M. Lalmas et al. (Eds.): ECDL 2010, LNCS 6273, 2010, 124-135.
Tungare, Manas et al., "Syncables: A Framework to Support Seamless Data Migration Across Multiple Platforms", Portable Information Devices, 2007. Portable07. IEEE International Conference on, May 25-29, 2007, 1-5.
Yin, Li et al., "SmartMig: Risk-Modulated Proactive Data Migration for Maximizing Storage System Utility", Proc. of IEEE MSST, 2006, 1-13.
"A Dictionary of Computing", Sixth Edition, Oxford University Press, 2008, pp. 1-2, 397.
"Amazon EC2 Developer Guide", Amazon.com, 2006, pp. 1-161.
"Amazon EC2 on Dec. 14, 2009", Amazon Web Services, http:// aws.amazon.com/releasenotes/3214, Sep. 16, 2015, pp. 1-3.
"Amazon Elastic Compute Cloud (Amazon EC2)", https://web. archive.org/web/20090115222039/http://aws.amazon.com/ec2, Internet Archive WayBack Machine, Jul. 26, 2015, pp. 1.
"Amazon Elastic Load Balancing Developer Guide", API Version, May 15, 2009, pp. 1-91.
"Announcing Amazon Elastic MAPREDUCE", https://aws.amazon.com/about-aws/wahts-new/2009/04/02/announcing-amazon-elastic-mapreduce, Sep. 16, 2015, pp. 1-3.
"Auto-Scaling Amazon EC2 With Amazon SQS", Amazon Web Services, https://aws.amazon.com/articles/1464, Sep. 16, 2015, pp. 1-4.
"AWS Solutions", Amazon Web Services, Internet Archive WayBack Machine, https://web.archive.org/web/20081016104952/ http://aws.amazon.com/solutions/aws-solutions/, Jul. 26, 2015, pp. 1.
"Cemaphore Systems Launches Mailshadow Online, The First Email Sync Online Service With Real-Time Email Migration, Replication and Recovery", Cemaphore Systems, Business Wire, Apr. 29, 2009, pp. 1-2.
"Cemaphore Systems' New Mailshadow Cloud-Based Email Migration and Continuity Solutions Provide Unmatched Sync Flexibility and Migration Simplicity", Cemaphore Systems, Business Wire, Mar. 23, 2009, pp. 1-2.
"Cemaphore Systems Refreshes Mailshadow Family With Enhancements for Mobile Users and Enterprises", Cemaphore Systems, Business Wire, Feb. 23, 2009, pp. 1-2.
"Cemaphore Systems, A Microsoft Gold Certified Partner, Provides Complete Cloud Computing Solution With Microsoft Business Productivity Online Suite and Mailshadow Online", http://www.reuters.com/article/2009/05/04/idUS73868+04-May-2009+BW20090504; Press Release; Monday, May 4, 2009 6:00 am EDT, pp. 2.
"Cloud Enablement, Simplified", BitTitan; www.bittitan.com; downloaded Jul. 23, 2015, pp. 1-8.
"CLOUDIWAY Emails Migration", http://www.cloudiway.com/ products/cloudiway-emails-migration/; retrieved Jul. 24, 2015; pp. 1-6.
"Elastic Load Balancing—Quick Reference Card", Amazon Web Services, May 15, 2009, pp. 1.
"Exchange 2003 to Exchange 2007 Migration", Cemaphore Systems, Internet Archive WayBack Machine; https://web.archive/ 20090410184759/http://www.cemaphore.com/blog/, Apr. 10, 2009, pp. 1-5.
"Exchange Migration", Cempahore Systems; Internet Archive WayBack Machine; http://web.archive.org/web/20090401224213/ http://www.cemaphore.com/exchange_migration.html, Apr. 1, 2009, pp. 1-2.
"MAILSHADOW Onsite", Cemaphore Systems, Internet Archive WayBack Machine; http://web.archive.org/web/20090401224218/ http://www.cemaphore.com/mailshadowo.html, Apr. 1, 2009, pp. 1-2.
"MAILSHADOW Sync Between Google Apps and Outlook Assures Email Freedom, Portability and Business Continuity", Cemaphore Systems, Business Wire, Jun. 11, 2009, pp. 1-2.
"MAILTRUST", Amazon Web Services, https://web.archive.org/ web/20081202152722/http://aws.amazon.com/solutions/case-studies/mailtrust/, Jul. 26, 2015, pp. 1.

(56) References Cited

OTHER PUBLICATIONS

"Migration to Office 365 Allows for Better Communication", BitTitan Blog; http://blog.bittitan.com/2012/07/20/a-successful-migration-to-office-365-allows-for-better-communication-between-international-offices/, Jul. 20, 2012, pp. 1-5.
"One of Seattle's Best Places to Work", Seattle Magazine; http://www.bittitan.com/about; downloaded Jul. 23, 2015, pp. 1-13.
"Release: Amazon EC2 on May 7, 2009", Amazon Web Services, https://aws.amazon.com/releasenotes/Amazon-EC2/2528, May 17, 2009, pp. 1-3.
"What is AWS", Amazon Web Services, https://web.archive.org/web/20090115222039/http://aws.amazon.com/what-is-aws/, Jul. 26, 2015, pp. 1.
"510 Patent Issued After Alice", Timeline of '510 patent; Exhibit A of Declaration of John Black filed on Sep. 17, 2015, pp. 1.
"Amazon Web Services Launches Amazon Elastic MAPREDUCE—A Web Service for Processing Vast Amounts of Data", Amazon.com Investor Relations Press Release, Amazon; downloaded Sep. 16, 2015, pp. 1-3.
"Answer: Demand for Jury Trial", United States District Court for the Western District of Washington at Seattle, *BitTitan, Inc., a Washington corporation*, Plaintiff v. *SkyKick, Inc., a Delaware corporation*, Defendant; filed Jul. 30, 2015, pp. 1-8.
"BPOS Migration Airlift coming to Europe", Blog Post, Mar. 2009, One page.
"Cloud Migrator 365 Price List", https://www.cloudmigrator365.com/customer/pricing/volume-discounts/; downloaded Jul. 24, 2015, pp. 1-2.
"CODETWO Office 365 Migration—Prices", http://www.codetwo.com/office-365-migration/pricing; retrieved Jul. 24, 2015, pp. 1-2.
"Construction Group Finds Microsoft Solution Better for Business Than Google Apps", Microsoft Customer Solution Customer Solution Case Study; Vinci, PLC; published Feb. 2010, pp. 1-7.
"Data Migration Assistant User Guide Release 6.1(3)", Cisco Systems, Inc., 2008, pp. 1-38.
"Data-Only Email Migrations", https://www.skykick.com/products/data-only-migrations; downloaded May 13, 2015, pp. 1-4.
"Data-Only Email Migrations—Just the email data, with the quality and ease you'd expect from SkyKick", https://www.skykick.com/products/data-only-migrations; downloaded May 13, 2015, pp. 1-4.
"Data-Only Email Migrations: Migrate Just the Mailbox Data"; http://www.skykick.com/migrate/data-only-migration; retrieved Jul. 24, 2015, pp. 1-6.
"Declaration of Case Collard in Support of Plaintiff's Motion for Preliminary Injunction"; United States District Court for the Western District of Washington at Seattle, *BitTitan, Inc., a Washington corporation*, Plaintiff v. *SkyKick, Inc., a Delaware corporation*, Defendant; filed Jul. 8, 2015, pp. 1-3.
"Declaration of Case Collard in Support of Plaintiff's Reply Regarding Patent Eligibility Under 35 U.S.C. § 101", United States District Court for the Western District of Washington at Seattle; *BitTitan, Inc., as Washington Corporation*, Plaintiff v. *SkyKick, Inc., a Delaware Corporation*, Defendant; filed Oct. 5, 2015, pp. 1-2.
"Declaration of Dr. John Black in Support of Plaintiff's Motion for Preliminary Injunction", United States District Court for the Western District of Washington at Seattle, *BitTitan, Inc., a Washington corporation*, Plaintiff v. *SkyKick, Inc., a Delaware corporation*, Defendant; filed Jul. 8, 2015, pp. 1-6.
"Declaration of Dr. Kristin L. Terris in Support of Plaintiff's Motion for Preliminary Injunction", United States District Court for the Western District of Washington at Seattle, *BitTitan, Inc., a Washington corporation*, Plaintiff v. *SkyKick, Inc., a Delaware corporation*, Defendant; filed Jul. 8, 2015, pp. 1-14.
"Declaration of Geeman Yip in Support of Plaintiff's Motion for Preliminary Injunction", United States District Court for the Western District of Washington at Seattle, *BitTitan, Inc., a Washington corporation*, Plaintiff v. *SkyKick, Inc., a Delaware corporation*, Defendant; filed Jul. 8, 2015, pp. 1-5.
"Declaration of James L. Davis, Jr. in Support of SkyKick, Inc.'s Response to BitTitan's Memorandum of Law Regarding Patent Eligibility Under §101", United States District Court Western District of Washington at Seattle, *BitTitan, Inc.*, Plaintiff v. *SkyKick, Inc.*, Defendant; filed Sep. 28, 2015, pp. 1-9.
"Declaration of James L. Davis, Jr. in Support of SkyKick, Inc's Opposition to BitTitan's Motion for a Preliminary Injunction", United States District Court Western District of Washington at Seattle; *BitTitan, Inc.*, Plaintiff v. *SkyKick, Inc.*, Defendant; filed Jul. 27, 2015, pp. 1-10.
"Declaration of John Black Regarding Patent Eligibility Under 35 U.S.C. § 101", United States District Court for the Western District of Washington at Seattle, *BitTitan, Inc., a Washington corporation*, Plaintiff v. *SkyKick, Inc., a Delaware corporation*, Defendant; filed Sep. 17, 2015, pp. 1-11.
"Declaration of Sandeep Chatterjee, Ph.D (Redacted)", United States District Court for the Western District of Washington at Seattle; *BitTitan, Inc., a Washington Corporation*, Plaintiff vs. *SkyKick, Inc., a Delaware Corporation*, Defendant; filed Jul. 27, 2015, pp. 1-63.
"Declaration of Sandeep Chatterjee, Ph.D. in Support of SkyKick's Response to BitTitan's Memorandum of Law Regarding Patent Eligibility Under §101", United States District Court for the Western District of Washington at Seattle, *BitTitan, Inc., a Washington Corporation*, Plaintiff vs. *SkyKick, Inc., a Delaware Corporation*, Defendant; filed Sep. 28, 2015, pp. 1-47.
"Enterprise Migration Suite, A Robust Alternative to Hybrid Migrations: Plan, Move, Set-Up and Manage 250+ Sea Cutover or Staged Migrations", https://www.skykick.com/migrate/enterprise-migration, 2015, pp. 1-7.
"Enterprise Migrations Made Easy", https://www.skykick.com/products/enterprise-migrations; downloaded May 13, 2015, pp. 1-6.
"Exchanges for Grid and Cloud Computing", www.britishpublishers.com; based on a project by Dirk Neumann and Jorn Altmann entitled "SORMA—Self-Organising ICT Resource Management", 2009, pp. 1-3.
"Exhibit A to the Declaration of Sandeep Chatterjee, Ph.D.", filed Sep. 28, 2015, pp. 1-6.
"Exhibit B to the Declaration of Sandeep Chatterjee, Ph.D.", filed Sep. 28, 2015, pp. 1-60.
"Exhibit D to the Supplemental Declaration of J. Black", Email exchange between G. Yip (BitTitan, Inc.) and L. Quesada (Amazon); Dec. 23, 2009-Dec. 27, 2009, pp. 1-2.
"Grid Computing—Making the Global Infrastruture a Reality", Wiley Series in Communications Networking & Distributed Systems; edits by F. Berman, G. Fox and A. Hey; copyright 2003, pp. 1-8.
"IEEE 100—The Authoritative Dictionary of IEEE Standard Terms", Seventh Edition, Published by Standards Information Network, IEEE Press; publishd Dec. 2000, pp. 1-3.
"Internet Solutions Division Strategy for Cloud Computing", Compaq Computer Corporation, CST Presentation, Nov. 14, 1996, pp. 1-4.
"Introducing the Skykick Application Suite—A New Way to Migrate to the Cloud", The SkyKick Blog; https://www.skykick.com/partners/blogs/skykick-blogs/april-2013/introducing-the-skykick-application-suite; Apr. 2013, pp. 1-3.
"Introducing YIPPIEMOVE '09", http://www.playingwithwire.com/2008/10/yippiemovenowoffersvolumediscountandcustom-migration/index.html; Oct. 2008, pp. 1-3.
"Introducing YIPPIEMOVE '09", Playing With Wire the Internet Startup Blog; http://www.playingwithwire.com/2008/09/; posted Sep. 28, 2008, pp. 1-3.
"Introducing YIPPIEMOVE '09—YIPPEEMOVE Migrates Workers United's Email Over Night", RSS, Playing With Wire the Internet Startup Blog; http://playingwithwire.com/2009/04/yippiemove-migrates-workers-uniteds-email-over-night/index-html; Apr. 2009, pp. 1-3.
"Introducing YIPPIEMOVE '09—YIPPIEMOVE Now Offers Volume Discounts and Custom Migration", RSS; Playing With Wire the Internet Startup Blog; http://www.playingwithwire.com/2008/10/yippiemove-now-offers-volume-discount-and-custom-migration/index.html; Oct. 2008, pp. 1-3.
"Introducing YIPPIEMOVE '09: Delayed Switch to the New Infrastructure", RSS, Playing With Wire the Internet Startup Blog;

(56) References Cited

OTHER PUBLICATIONS http://www.playingwithwire.com/2009/05/delayed-switch-to-the-new-infrastructure/index.html; May 2009, pp. 1-3.
"IUR Skykick Migration Offer", https://www.skykick.com/iur; Exhibit I of Declaration of Case Collard filed on Jul. 8, 2015, pp. 1-2.
Jul. 2015 Update Appendix 1: Examples, Jul. 2015; pp. 1-22.
"Mail and Data Migration Price Per User", Migration Price List; Cloudiway; http://cloudiway.com/price-list/, pp. 1-3.
"MAILSHADOW 2.2 for Exchange Migration Datasheet", Cemaphore Systems, https://web.archive.org/web/20081227000255/; http://www.cemaphore.com/downloads/cemaphore_migration_datasheet.pdf.; Dec. 27, 2008, pp. 1-2.
"Microsoft Computer Dictionary", Fifth Edition; Published by Microsoft Press, A Division of Microsoft; copyright 2002, pp. 1-3.
"Microsoft Pinpoint—BitTitan, Kirkland, Washington USA (HQ)", https://pinpoint.microsoft.com/en-OM/Companies/4297151790; downloaded Jul. 22, 2015, pp. 1.
"Microsoft Pinpoint Search Results 'Cloud Email Migration'", https://pinpoint.microsoft.com/en-US/search?type=companies &keyword=cloud+email+migration&page=0; downloaded Jul. 23, 2015, pp. 1-4
"Microsoft Pinpoint: Skykick, Seattle, Washington, USA (HQ)", https://pinpoint.microsoft.com/en-US/Companies/4298392373; downloaded Jul. 22, 2015, pp. 1.
"Migrate to Office 365 With CLOUDMIGRATOR 365", https://www.cloudmigrator365.com/customer/platforms/; downloaded Jul. 24, 2015, pp. 1-2.
"Migrating to Office 365: Pitfalls to Avoid", BitTitan Blog; https://blog.bittitan.com/2011/06/10/getting-to-office-365-migration-pitfalls/; Oct. 6, 2011, pp. 1-4.
"Migration Suites, Automation for Predictable, Seamless and Stress-Free Office 365 Migrations", http://www.skykick.com/migrate; retrieved Jul. 24, 2015, pp. 1-27.
"MIGRATIONWIZ is a Secure, Quick, Low Cost, Self-Service Mailbox Migration Solution to Exchange Online", Microsoft Online Services; published Feb. 2009, pp. 1-5.
"MIGRATIONWIZ Performed the Largest Gmail Migration in Europe to Microsoft Exchange", BitTitan Blog (case studies); https://blog.bittitan.com/2010/02/025/migrationwiz-performed-the-largest-gmail-migration-in-Europe-to-Microsoft-exchange/; Feb. 25, 2010, pp. 1-4.
"MIGRATIONWIZ Screenshot", www.migrationwiz.com/secure/mailbox, screenshot from a demonstration of Migration Wiz (May 2009); full video available at: https://channel9.msdn.com/Events/TechEd/NorthAmerica/2009/UNC310, May 2009, pp. 1.
"Moving the Mail", United States Postal Service; https://about.usps.com/who-we-are/postal-history/moving-mail.htm; downloaded Sep. 27, 2015, pp. 1-41.
"Office 365 to Office 365 Migrations", BitTitan Blog; Jan. 12, 2011; https://blog.bittitan.com/2011/12/01/office-365-to-office-365-migrations/, pp. 1-5.
"Order Denying Motion for Preliminary Injunction", United States District Court Western District of Washington at Seattle, *BitTitan, Inc., a Washington corporation*, Plaintiff v. *SkyKick, Inc., a Delaware corporation*, Defendant; issued Aug. 27, 2015, pp. 1-16.
"Order Granting Motion to Voluntarily Dismiss Appeal", United States District Court for the Western District of Washington at Seattle, *BitTitan, Inc., a Washington corporation*, Plaintiff v. *SkyKick, Inc., a Delaware corporation*, Defendant; ordered Oct. 15, 2015, pp. 1.
"Plaintiff's Motion for Preliminary Injunction", United States District Court for the Western District of Washington at Seattle, *BitTitan, Inc., a Washington corporation*, Plaintiff v. *SkyKick, Inc., a Delaware corporation*, Defendant.; filed Jul. 8, 2015, pp. 1-24.
"Plaintiff's Memorandum of Law Regarding Patent Eligibility Under 35 U.S.C. 101", United States District Court for the Western District of Washington in Seattle, *BitTitan, Inc., a Washington corporation*, Plaintiff v. *SkyKick, Inc., a Delaware corporation*, Defendant; filed Sep. 17, 2015, pp. 1-17.
"Plaintiff's Motion to Voluntarily Dismiss Appeal", United States District Court for the Western District of Washington at Seattle, *BitTitan, Inc., a Washington corporation*, Plaintiff v. *SkyKick, Inc., a Delaware corporation*, Defendant; filed Oct. 13, 2015, pp. 1-2.
"Plaintiff's Reply in Support of Motion for Preliminary Injunction", United States District Court for the Western District of Washington at Seattle, *BitTitan, Inc., a Washington corporation*, Plaintiff v. *SkyKick, Inc., a Delaware Corporation*, Defendant; filed Jul. 31, 2015, pp. 1-18.
"Plaintiff's Reply Regarding Patent Eligibility Under 35 U.S.C. § 101", United States District Court for the Western District of Washington at Seattle, *BitTitan, Inc., a Washington corporation*, Plaintiff v. *SkyKick, Inc., a Delaware corporation*, Defendant; filed Oct. 5, 2015, pp. 1-8.
"Product Comparison Summary", https://www.skykick.com/products/compare-skykick-migrations; downloaded May 13, 2015, pp. 1-3.
"Quest Move Mailbox Manager", Quest Software.com; Internet Archive WayBack Machine; downloaded Jul. 25, 2015, pp. 1.
"Quest Move Mailbox Manager—Features & Benefits", Quest Software; Internet Archive WayBack Machine; https://web.archive.org/web/20050319032038/http://wm.quest.com/products/MoveMailboxManager/features_and_benefits.asp; downloaded Jul. 25, 2015, pp. 1.
"Report of the Filing or Determination of an Action Regarding a Patent or Trademark", U.S. District Court Western District of Washington, *BitTitan, Inc., a Washington corporation* (Plaintiff) and *SkyKick, Inc., a Delaware corporation* (Defendant); dated May 15, 2015; pp. 1.
"Report on the Filing or Determination of an Action Regarding a Patent or Trademark", U.S. District Court Western District of Washington, *BitTitan, Inc., a Washington corporation* (Plaintiff), *SkyKick, Inc., a Delaware corporation*; filed May 14, 2015, pp. 1.
"RSYNC(1)—Linux Man Page", http://linux.die.net/man/1/rsync; downloaded Jul. 26, 2015, pp. 1-49.
"SkyKick Creates New Way to Migrate SMBs to Cloud; Launches Application Suite to Help Microsoft Partners Move Customers to Office 365", https://www.skykick.com/press; posted Apr. 22, 2013, pp. 1-2.
"SkyKick Launches Data-Only Migration Application", SkyKick, Posted Nov. 18, 2014, pp. 1.
"SkyKick Launches Enterprise Migration Suite; Provides New Way to Move Enterprises to Microsoft Office 365", SkyKick; Posted May 20, 2014, pp. 1-2.
"SkyKick Launches New Cloud Management Category, Secures Additional $10 Million in Funding", SkyKick, https://www.skykick.com/about/press/2015/skykick-launches-new-cloud-management-category-secures-additional-$10-million-in-funding; Jun. 30, 2015, pp. 1-3.
"SkyKick Named One of Washington's Best Companies to Work for in 2015", SkyKick, http://www.skykick.com/about/press/2015/skykick-named-one-of-washingtons-best-companies; Jul. 21, 2015, pp. 1-3.
"SkyKick Wins Red Herring Top 100 Award", SkyKick Press Area; https://www.skykick.com/press; Posted Jun. 5, 2015;, pp. 1-2.
"SkyKick, Inc.'s Opposition to BitTitan's Motion for a Preliminary Injunction (Public Version)", United States District Court Western District of Washington at Seattle, *BitTitan, Inc.*, Plaintiff v. *SkyKick, Inc.*, Defendant; filed Jul. 27, 2015, pp. 1-31.
"SkyKick's Response to BitTitan'S Memorandum of Law Regarding Patent Eligibility Under § 101" , United States District Court Western District of Washington at Seattle, *BitTitan, Inc.*, Plaintiff, v. *SkyKick, Inc.*, Defendant; filed Sep. 28, 2015, pp. 1-18.
"Small Business Migration Suite", http://www.skykick.com/migrate/smb-migration; retrieved Jul. 24, 2015, pp. 1-8.
"SMB Migration Suite", https://www.skykick.com/products/small-business-migrations; downloaded May 13, 2015, pp. 1-4.
"SORMA—Self-Organizing ICT Resource Management", http://www.sorma-project.org/; retrieved Sep. 16, 2015, pp. 1-2.
"Step 1: Where Are we Moving From?", YippieMove, "The world's easiest email transfer tool"—Screenshot of video at 0:41 (Oct. 21, 2008). The video is available and can be viewed at https://www.youtube.com/watch?v=RVRnclKp001, Oct. 21, 2008, pp. 1.

(56) References Cited

OTHER PUBLICATIONS

"Stipulated Order of Dismissal", United States District Court for the Western District of Washington at Seattle, *BitTitan, Inc.*, Plaintiff v. *SkyKick, Inc.*, Defendant; dated Oct. 13, 2015, pp. 1-3.

"Supplemental Declaration of Case Collard in Support of Plaintiff's Motion for Preliminary Injunction", United States District Court for the Western District of Washington at Seattle, *BitTitan, Inc., a Washington corporation*, Plaintiff v. *SkyKick. Inc., a Delaware corporation*, defendant; filed Jul. 31, 2015, pp. 1-2.

"Supplemental Declaration of Dr. John Black in Support of Plaintiff's Motion for Preliminary Injunction (Public Version)", United States District Court for the Western District of Washington at Seattle; *BitTitan, Inc., a Washington corporation*, Plaintiff v. *SkyKick, Inc., a Delaware corporation*, Defendant; filed Jul. 31, 2015, pp. 1-3.

"Supplemental Declaration of John Black Regarding Patent Eligibility Under 35 U.S.C. §101", United States District Court for the Western District of Washington at Seattle, *BitTitan, Inc., a Washington corporation*, Plaintiff v. *SkyKick, Inc., a Delaware corporation*, Defendant; filed Oct. 5, 2015, pp. 1-21.

"Tar File Info", Tar, Release 1.11.8, Info Pages, available at http://ftp.gnu.org/gnu/tar/; Exhibit 4 of the Declaration of James L. Davis filed Jul. 27, 2015, pp. 1-144.

"The Revised Language of Independent Claim 1", Exhibit C, filed Sep. 17, 2015, pp. 2.

"The World's Easiest Email Transfer Tool", https://www.youtube.com/watch?v=RVRnclKb00I; retrieved Sep. 27, 2015, pp. 1-2.

"The World's Easiest Email Transfer Tool—Screenshot", YouTube; uploaded Oct. 21, 2008, pp. 1.

"Videotaped Deposition of John R. Black, Jr., Ph.D.", In the United States District Court for the Western District of Washington at Seattle, *BitTitan, Inc., a Washington corporation*, Plaintiff v. *SkyKick, Inc., a Delaware corporation*, Defendant; Sep. 25, 2015, pp. 1-39.

"Videotaped Deposition of: Sandeep Chatterjee, Ph.D.", United States District Court Western District of Washington at Seattle; *BitTitan, Inc., a Washington Corporation*, Plaintiff v. *SkyKick, Inc., a Delaware corporation*, Defendant, Oct. 2, 2015, pp. 1-63.

"Virtualization Overview", VMware White Paper; copyright 2006, pp. 1-11.

"VMware Distributed Resource Scheduler (DRS)—Dynamic Load Balancing and Resource Allocation for Virtual Machines", VMware DRS, Product Datasheet; copyright 2009, pp. 1-3.

"VMware VIRTUALCENTER—Centralized Management, Automation and Optimization for IT Infrastructure", VMware Product Datasheet; copyright 1998-2007, pp. 1-3.

"Webster's New College Dictionary", Third Edition, Houghton Mifflin Harcourt; copyright 2008, 1-2, pp. 900.

"Welcome o the MigrationWiz Blog", Blog Post, Apr. 2009, One page.

"Why YIPPIEMOVE", https://www.yippiemove.com/; downloaded Jul. 29, 2015, pp. 1-2.

"YIPPEEMOVE Help—What is YIPPIEMOVE?", https://web.archive.org/web/20090404124613/http:/www.yippiemove.com/help.html#batch; downloaded Jul. 14, 2015, 1.

"YIPPEEMOVE Now Offers Volume Discount and Custom Migration", Playing With Wire the Internet Startup Blog; http://www.playingwithwire.com/2008/10/yippiemovenowoffersvolumediscountandcustomermigration/index.html, 2008, pp. 1-3.

"YIPPIEMOVE—Email Transfers Made Easy", Internet Archive WayBack Machine; https://web.archive.org/web/20090410191724/http:/www.yippiemove.com/index.html; downloaded Jul. 14, 2015, pp. 1.

"YIPPIEMOVE—Migrate Your Email", Internet Archive WayBack Machine; downloaded Jul. 26, 2015; https://web.archive.org/web/20080724022235/http://www.yippiemove.com/;, pp. 1.

"YIPPIEMOVE About: Migrate Your Email in Style", https://web.archive.org/web/20080831184539/http://www.yippiemove.com/about.html; retrieved Jul. 26, 2015, pp. 1.

Anderson, David et al., ""Migration to Microsoft Online Services From Exchange and Non-Microsoft Platforms"", UNC310; https://channel9.msdn.com/Events/TechEd/NorthAmerica/2009/UNC310, 2009, pp. 1-4.

Barr, Jeff, New Features for Amazon EC2: Elastic Load Balancing, Auto Scaling, and Amazon Cloudwatch, AWS Official Blog, posted May 18, 2009; https://aws.amazon.com/blogs/aws/news-aws-load-balancing-automatic-scaling-and-cloud-monitoring-services/, pp. 1-7.

Barr, Jeff, ""Big Day for Amazon EC2: Production, SLA, Windows, and 4 New Capabilities"", AWS Official Blog, http://aws.amazon.com/blogs/aws/big-day-for-ec2, Oct. 23, 2008, pp. 1-6.

Bekker, Scott, "Partner: Tool Targets 3 Problems With Large Migrations to Office 365", Bekker's Blog, Redmond Channel Partner, Jul. 24, 2015, pp. 1-5.

Bekker, Scott, "Third-Party Tools for Office 365 Migration and Management", Redmond Channel Partner Online; https://rcpmag.com/Articles/2014/06/01/Power-Tools-For-Office-365.aspx?p=1; Jun. 9, 2014, pp. 1-5.

Bigelow, Stephen J., ""Choose the Right Office 365 Migration Tool"", http:/searchexchange.techtarget.com/feature/Choose-the-right-Office-365-migration-tool, Nov. 2014, pp. 1-4.

Black, John, "Skykicks Infringement of U.S. Pat. No. 8,938,510 Claims 1, 2, and 7", Exhibit A to Declaration of Dr. John Black; filed Jul. 8, 2015, pp. 1-8.

Bose, Rohan et al., "Migrating SMB Customers to Office 365: How Channel Partners Can Leverage Migration Tools to Win in the Cloud", AMI White Paper; published May 2015, pp. 1-12.

Buyya, Rajkumar, "Market-Oriented Cloud Computing: A Vision, Hype, and Reality of Delivering Computing as the 5th Utility", The Gridbus Project, The University of Melbourne, May 18, 2009, pp. 1-62.

Buyya, Rajkumar et al., "Market-Oriented Cloud Computing: Vision, Hype, and Reality for Delivering IT Services as Computing Utilities", Grid Computing and Distributed Systems (Grids) Laboratory, Department of Computer Science and Software Engineering, The University of Melbourne, Australia; Jul. 18, 2008, pp. 1-11.

Cardellini, Valeria et al., "Dynamic Load Balancing on Web-Server Systems", IEEE Internet Computing, vol. 3, No. 3, May-Jun. 1999, pp. 1-24.

Dasgupta, Koustuv et al., "QoSMig: Adaptice Rate-Controlled Migration of Bulk Data in Storage Systems", Data Engineering, 2005. ICDE 2005. Proceedings. 21st International Conference on, Apr. 5-8, 2005, pp. 816-827.

Doninger, Cheryl et al., "Balancing the Load—SAS Service Technologies for Scalability", SAS Global Forum 2008, Systems Architecture, 2008, pp. 1-13.

Doninger, Cheryl et al., "SAS Goes Grid—Managing the Workload Across Your Enterprise", SUGI 31, Systems Architecture, Paper 211-31; SUGI 31 Proceedings, San Francisco, California, Mar. 26-29, 2006, pp. 1-32.

Dornemann, Tim et al., "On-Demand Resource Provisioning for BPEL Workflows Using Amazon's Elastic Compute Cloud", CCGRID '09 Proceedings of the 2009 9th IEEE/ACM International Symposium on Cluster Computing and the Grid; 2009, pp. 1-10.

Foster, Ian et al., "The Grid: Blueprint for a New Computing Infrastructure", Second Edition; The Elsevier Series in Grid Computing; copyright 2004, pp. 1-48.

Foster, Ian, "What is the Grid? A Three Point Checklist", Argonne National Laboratory & University of Chicago; Jul. 20, 2002, pp. 1-4.

Fujiwara, Ikki et al., "Market-Based Resource Allocation for Distributed Computing", IPSJ SIG Technical Report, 2009 Information Processing Society of Japan, pp. 1-6.

Gite, Vivek, "Move of Migrate User Accounts From Old Linux Server to a New Linux Service", Published Dec. 13, 2006; http://www.cyberciti.biz/faq/howto-move-migrate-user-accounts-old-to-new-server/, pp. 1-20.

Goyal, Brajesh, "Oracle Data Base 10G: The Database for the Grid", An Oracle White Paper, Nov. 2003, pp. 1-18.

Greene, Tim, "Avoid the Gotchas of Office 365 Migrations", Network World, Jun. 30, 2014, pp. 1-3.

(56) References Cited

OTHER PUBLICATIONS

Karagiannis, Thomas, "Hermes: Clustering Users in Large-Scale E-mail Services", SoCC'10, Jun. 10-11, 2010, pp. 1-12.
Liu, Liang et al., "IBM Research Report: Automatic Model-Based Service Hosting Environment Migration", RC24436 (C0711-044), Nov. 27, 2007.
Lu, Chenyang et al., "Aqueduct: online data migration with performance guarantees", Conference on File and Storage Technologies (FAST'02), Jan. 28-30, 2002, pp. 219-230.
Lynch, C. G., ""Microsoft Further Enhances Cloud Computing With Online Sharepoint, Exchange"", CIO; CIO.com, Nov. 17, 2008, pp. 1-4.
MacVittie, Don, "Intro to Load Balancing for Developers—The Algorithms", F5 Networks, Inc.; www.f5.com, Mar. 31, 2009, pp. 1-3.
McCorry, Kieran, "Microsoft Exchange 2003 Deployment & Migration", Elsevier Digital Press; copyright 2004, pp. All.
McLaughlin, Kevin, "Parnters Baffled by Microsoft's Mixed Messages on Free Office 365 Migrations Program", CRN New, Analysis, and Perspective for Vars and Technology Integrators; The Channel Company; http://www.crn.com/new/cloud/300073596/partners-baffled-by-microsofts-mixed-messages-on-free-office-365-migrations-program.htm, Aug. 4, 2014, pp. 1-2.
Mohamed, Arif, "A History of Cloud Computing", ComputerWeekly.com; http://www.computerweekly.com/feature/A-history-of-cloud-computing?vgnextfmt=print, Mar. 27, 2009, pp. 1-2.
Motal, Julius, "Microsoft Office 365 Launching Jun. 28", PCMag.com; Jun. 6, 2011, pp. 1-4.
Nabrzyski, Jarek et al., "Grid Resource Management : State of the Art and Future Trends", Kluwer Academic Publishers; http://www.cs.mcgill.ca/~maheswar/COURSES/ANC2004/PAPERS/RMS_book.pdf.; 2004, pp. 1-86.
Petersson, Viktor, "Misericordia University Completes Successful Email Migration With YIPPIEMOVE", Wireload; http://wireload.net/news/2009/11/misericordia_university_completes_successful_email_migration_with_yippiemove.html; published Nov. 24, 2009, pp. 1-2.
Petersson, Viktor, "YIPPIEMOVE Now Supports Office 365", Wireload, http://wireload.net/news/2011/12/yippiemove_now_supports_office_365.html; Dec. 8, 2011, pp. 1-2.
Pick, Gershon, "Data Migration Concepts & Challenges", Retrieved Feb. 26 from http://www._aymgael._com/pdf%_20reports/Data%20Migration%_20Concepts%_20&%_20Challenges. pdf, 2001, pp. 1-15.
Pouzin, Dominic J. et al., "On-Demand Mailbox Synchronization and Migration System", U.S. Appl. No. 61/328,003, filed Apr. 26, 2010, pp. 1-29.
Ranjan, S et al., "QoS-Driven Server Migration for Internet Data Centers", Quality of Service, 2002. Tenth IEEE International Workshop on, 2002, pp. 3-12.
Regalado, Antonio, "Who Coined 'Cloud Computing'?", MIT Technology Review; Oct. 31, 2011, pp. 1-2.
Rubens, Paul, ""Microsoft Office 365 Adoption Takes Off, War With Google Apps Rages On"", CIO New Analysis, Jan. 22, 2015, pp. 1-4.
Sachs, Robert R., "Theone Year Anniversary: The Aftermarth of #ALICESTORM", Bilski Blog, The Fenwick & West Bilski Blog; http://www.bilskiblog.com/blog/2015/06/the-one-year-anniversary-the-aftermath-of-alicestorm.html, Jun. 20, 2015, pp. 1-11.
Song, Biao et al., "A Novel Cloud Market Infrastucture for Trading Service", Internet Computing and Network Security Lab, Department of Computer Engineering, Kyung Hee University, Global Campus, South Korea; 2009 International Conference on Computational Science and its Applications, 2009, pp. 1-7.
Stacey, Craig et al.; "The Water Fountain vs. The Fire Hose: An Examination and Comparison of Two Large Enterprise Mail Service Migrations", LISA '09: 23rd Large Installation System Administration Conference, Nov. 1-6, 2009, pp. 29-46.
Stage, Alexander et al.; "Network-aware migration and scheduling of differentiated virtual machine workloads", ICSE'09 Workshop (Cloud'09), May 23, 2009, pp. 1-6.
Stanojevic, Rade et al., "Load Balancing Vs. Distributed Rate Limiting: An Unifying Framework for Cloud Control", Hamilton Institute, NUIM, Ireland; IEEE International Conference on Communications; Jun. 14-18, 2009.
Strodl, Stephan et al., "Automating Logical Preservation for Small Institutions with Hoppla", M. Lalmas et al. (Eds.): ECDL 2010, LNCS 6273, 2010, pp. 124-135.
Talbot, Chris, "Skykick Gives Office 365 Partners Tools for SMB Customers", Talkin Cloud, Apr. 25, 2013; http://talkincloud.com/cloud-computing-management/skykick-gives-office-365-partners-migration-tools-smb-customers, pp. 1.
Tsidulko, Joseph, ""Riled Partners: Microsoft, With FASTTRACK Migrations, Will be Our Competitor"", CRN News, Analysis, and Perspective for Vars and Technology Integrators; The Channel Company; http://www.crn.com/new/cloud.300077416/riled-partners-Microsoft-with-fasttrack-migrations-will-be-our-competitor.htm?itc=refresh, Jul. 10, 2015, pp. 1-6.
Tungare, Manas et al., "Syncables: A Framework to Support Seamless Data Migration Across Multiple Platforms", Portable Information Devices, 2007. PORTABLE07. IEEE International Conference on, May 25-29, 2007, pp. 1-5.
Varia, Jinesh, "Cloud Architectures", Amazon Web Services, Jun. 2008, pp. 1-14.
Vogels, Werner, "All Things Distributed", Werner Vogel's weblog on building scalable and robust distributed systems; http://www.allthingsdistributed.com/2009/05/amazon_cloudwatch.html; May 17, 2009, pp. 1-3.
Von Eicken, Thorsten, "Amazon Adds Load Balancing, Monitoring, and Autoscaling", Cloud Management Blog; posted May 18, 2009; http://www.rightscale.com/blog/cloud-industry-insights/amazon-adds-load-balancing-monitoring-and-autoscaling, pp. 1-12.
Walsh, Larry, "Skykick Aims for Enterprise Office 365 Migrations", Channel Business, May 20, 2014; http://www.channelnomics.com/channelnomics-use/news/2370028/skykick-aims-for-enterprise-office-365-migrations, pp. 1-8.
Work, Henry, "SCALR: The Auto-Scaling Open-Source Amazon EC2 Effort", TechCrunch, posted Apr. 3, 2008; http://techcrunch.com/2008/04/03/scalr-the-auto-scaling-open-source-amazon-ec2-effort/, pp. 1-6.
Yin, Li et al., "SmartMig: Risk-Modulated Proactive Data Migration for Maximizing Storage System Utility", Proc. of IEEE MSST, 2006, pp. 1-13.
You, Xindong et al., "RAS-M: Resource Allocation Strategy Based on Market Mechanism in Cloud Computing", 2009 Fourth ChinaGrid Annual Conference; IEEE Computer Society; downloaded Dec. 3, 2009 from IEEE Xplore, pp. 1-8.

\* cited by examiner

SYSTEMS AND METHODS FOR MIGRATING MAILBOX DATA FROM SYSTEMS WITH LIMITED OR RESTRICTED REMOTE ACCESS

TECHNICAL FIELD

Examples described herein relate to computing systems including computing systems providing software as a service. Examples of mailbox migration between messaging systems is described, which may include computing systems programmed to open a communication channel with a mailbox migration service to facilitate migration.

BACKGROUND

Software as a service has increased in popularity. Generally, in software as a service systems, software and associated data may be hosted on one or more computing systems (e.g. in the "cloud") and may be accessed by client computing systems over a network connection using, for example, a web browser.

Software hosting systems (e.g. in the "cloud") may connect to client systems by calling application programming interfaces (APIs) supported by those client systems. Utilizing APIs, the software hosting system may obtain access to data or functionality of the client system that may be necessary or desirable in performing the software service.

Mailbox migration services may be provided as software as a service. Mailbox migration generally refers to copying messaging system content from a source messaging system to a destination messaging system. Examples of mailbox migrations include uni-directional migrations where messaging system content is moved from the source messaging system to the destination messaging system and bi-directional synchronization where messaging system content may be maintained on both the source and destination messaging systems.

DETAILED DESCRIPTION

Figure 1:
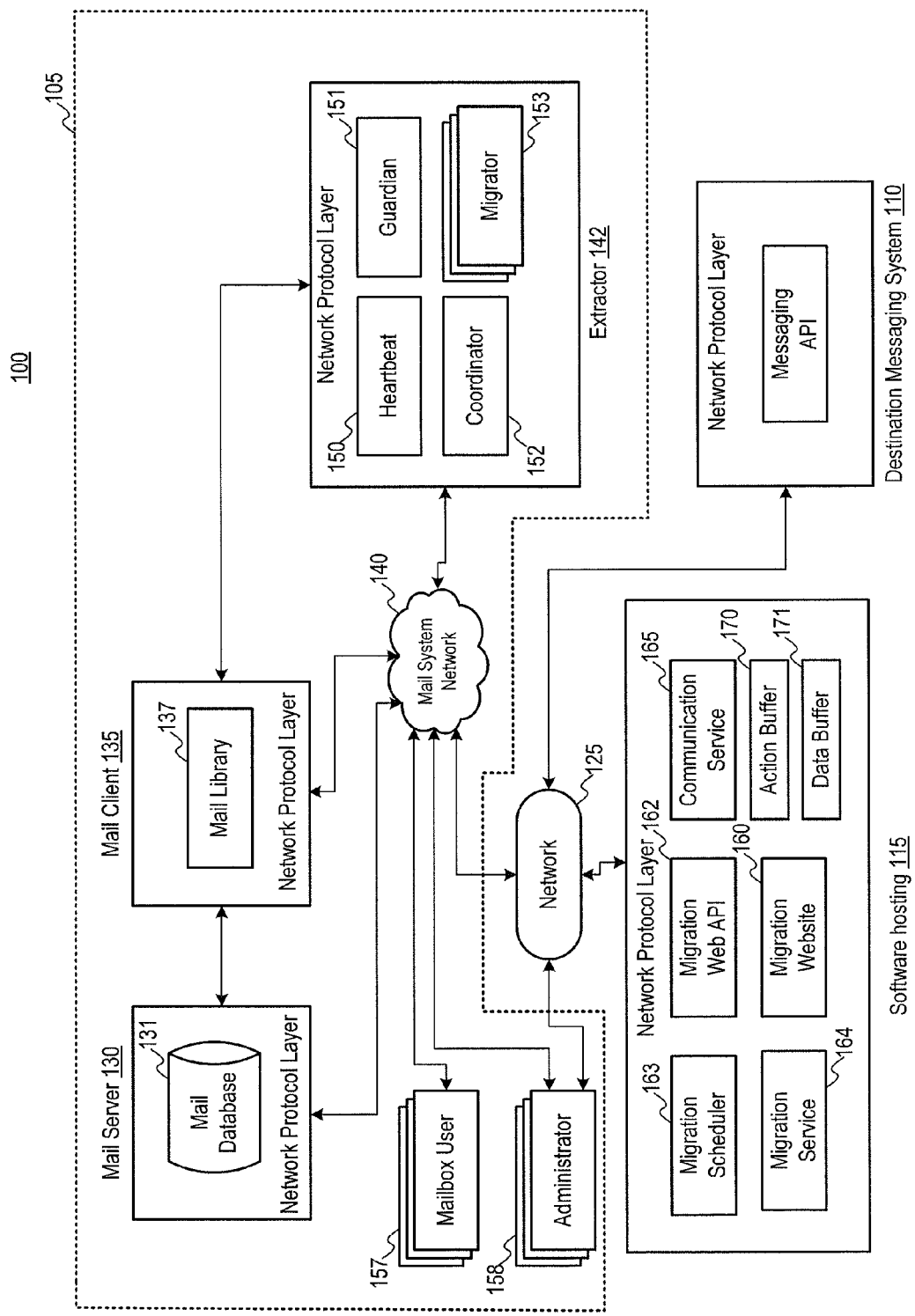
FIG. 1 is a schematic illustration of a system arranged in accordance with an embodiment of the present invention.

Certain details are set forth below to provide a sufficient understanding of embodiments of the invention. However, it will be clear to one skilled in the art that embodiments of the invention may be practiced without various of these particular details. In some instances, well-known computer system components, networking components, circuits, and software operations have not been shown in detail in order to avoid unnecessarily obscuring the described embodiments of the invention.

As described above, software hosting systems that may provide software as a service (e.g. mailbox migration services) may connect to client systems (e.g. source messaging systems) over a network by calling APIs support by those client systems. However, some client systems may be behind a network firewall and/or may not support web APIs. The firewall may block certain network activities. For example, some firewall systems may block connections over the network to APIs exposed by the client system. Accordingly, software as a service systems (including, for example mailbox migration services) may not be able to connect to client systems behind the firewall without having a system administrator create a hole in the firewall for use by the software hosting system.

In other examples, some client systems may not support web services and/or offer APIs for remote access to data or functionality. For example, Lotus Domino, a collaborative software suite developed by IBM, which may provide a Lotus Notes messaging system, does not provide any API to remotely access its data from the internet without establishing a Virtual Private Network (VPN). Accordingly, software hosting systems that provide software as a service (e.g. mailbox migration services) may not be able to access client systems which do not have APIs for remote data access if the software hosting system relies on APIs for required data and functionality access. Further, if such a system is behind a firewall, it may not be possible to access the system directly for data or functionality.

Generally, embodiments of source messaging systems described herein may not be accessible to software hosting systems such as mailbox migration systems on their own. Embodiments of the present invention accordingly provide a data transmission mechanism between client systems and software hosting systems. Examples of the data transmission mechanism may operate through firewalls that allow common HTTP access. Examples of the data transmission mechanism may operate using a peering technique. In this manner, software as a service may be provided to client systems behind firewalls, client systems without web APIs for remote access of data, or both. Examples include providing a software component (referred to herein as an extractor) to the client system for use in establishing communication between the software hosting system and the client system.

As described above, mailbox migration services may be provided as software as a service. Mailbox migration generally refers to copying messaging system content from a source messaging system to a destination messaging system. Examples of mailbox migrations include uni-directional migrations where messaging system content is moved from the source messaging system to the destination messaging system and bi-directional synchronization where messaging system content may be maintained on both the source and destination messaging systems.

Generally, any number of mailboxes may be migrated in accordance with embodiments of the present invention. A mailbox generally refers to messaging system content associated with an account (e.g. a user) on the messaging system. The mailbox may include any amount or type of messaging system content and may have folders and other organization that should be replicated during a migration. Mailbox migration is not a task that may be completed by hand, because the amount of data involved in migrating a mailbox, let alone a large number of mailboxes such as all mailboxes associated with an enterprise, may be too great or cumbersome for an individual to transfer by hand in a lifetime. Beyond simply the amount of data, the formats of stored mailbox data (including, but not limited to, emails, calendars, contacts, tasks, etc.) between source and destination systems may require conversion (e.g. translation) between the format of the host and destination systems. The large amount of conversion (e.g. translation) further prohibits manual mailbox transfer. Efficiently completing mailbox migrations may be desirable for enterprises with large numbers of mailboxes that desire to upgrade or change to a different messaging system.

Messaging system content may include, but is not limited to, emails, calendars, contacts, notes, journals, tasks, and combinations thereof. In some examples, mailbox migration may occur between different types of messaging systems. Examples of messaging systems types include, but are not limited to, Microsoft Exchange, Microsoft Office 365, Microsoft Live@edu, Google Apps, Novell Groupwise, Zimbra, Lotus Notes, IMAP, and POP.

Examples of mailbox migration services are described in co-pending U.S. Published Patent Application 2011/0264748, entitled "On-demand mailbox synchronization and migration system," published on Oct. 27, 2011 from application Ser. No. 12/961,268, filed on Dec. 6, 2010 and claiming priority to provisional application No. 61/328,003. The entire contents of U.S. Published Application 2011/0264748, U.S. Ser. No. 12/961,268, and provisional application Ser. No. 61/328,003, are hereby incorporated by reference in their entirety for any purpose.

FIG. 1 is a schematic illustration of a system arranged in accordance with an embodiment of the present invention. The system 100 includes a source messaging system 105, a destination messaging system 110, and a software hosting system 115 (e.g. migration system). Each of the source messaging system 105, the destination messaging system 110, and the software hosting system 115 may be implemented using computing systems which may include one or more processors, circuitry, memory, interfaces, and other components and may be programmed with computer executable instructions for performing the functionalities described herein. It is to be understood that the arrangement of the computing systems is flexible in embodiments of the present invention. Generally, the software hosting system 115 may be programmed to provide a software service to one or more other systems (e.g. the source and/or destination messaging systems). In the example of FIG. 1, for example, the software hosting system 115 may be programmed to provide mailbox migration services. The source messaging system 105 may be a computing system hosting messaging system content that may benefit from services provided by the software hosting system 115. In other examples, the source messaging system 105 may be representative of any client system that may benefit from the services of the software hosting system 115.

The source messaging system 105 may not include APIs for access by the software hosting system 115, and/or may be behind a firewall from a network 125 accessible to the software hosting system 115. For example, the source messaging system 105 may include a mail server 130 which may include a mail database 131 which may store messaging system content. The mail server 130 may, for example, be implemented as a Lotus Domino server, or any other messaging system server. The mail database 131 may be implemented as a Lotus NSF database, or any other mail database. The source messaging system 105 may include a mail client 135. The mail client 135 is exemplary, and any number of mail clients may be included in the source messaging system 105. The mail client 135 may include a mail library 137. In one example the mail client 135 may be implemented by a Lotus Notes client and the mail library 137 may be implemented as a Lotus COM library. The mail server 130 and mail client 135 may be in communication with one another, directly or through a mail system network 140 The mail system network 140 may be wired or wireless, and may be implemented using any networking technologies. The mail system network 140 may be behind a firewall from the network 125 in some examples. The mail server 130 may in some examples not expose APIs to the software hosting system 115 through the network 125 suitable for use in obtaining data from the mail server 130 for use in providing software as a service from the software hosting system 115.

Accordingly, in embodiments of the present invention, the source messaging system 105 may further include an extractor 142. The extractor 142 may be implemented as computer executable instructions programmed on a computing system in communication with the mail system network 140. In some example, the extractor 142 may be run on the same computing system as the mail server 130, mail client 135, or both. The extractor 142 may facilitate communication between the mail server 130 and/or mail client 135 and the software hosting system 115. The extractor 142 may be implemented as an executable file which may be installed on the source messaging system 105, for example by an administrator. The extractor 142 may initiate a peering connection with the software hosting system 115 using HTTP (e.g. port 80, 443, or other custom ports) through a firewall for the mail system network 140—something most firewalls may allow or be configured to allow. In this manner, the extractor 142 may request actions to perform from the software hosting system 115, perform the actions in the source messaging system 105, and send responses to the software hosting system 115 through the firewall. Accordingly, in some examples no extra port is required to be opened in a firewall between the mail system network 140 and network 125.

Any number of extractors, including the extractor 142 may be provided on the source messaging system 105. In some examples, one computer or computing system may be provided in the source messaging system 105 per extractor. This may, for example, ensure sufficient processing resources to implement each extractor. In mailbox migration examples, each extractor, such as the extractor 142 may handle up to a maximum number of mailbox migrations concurrently, a maximum of 30 mailbox migrations in one example. Accordingly, if a greater number of concurrent mailbox migrations is desired, additional extractors may be provided. The extractor 142 may include a heartbeat 150. The heartbeat 150 may check periodically, such as every 10 seconds in one example, to confirm the mail server 130 remains responsive, and may maintain a timestamp of times during which the mail server 130 was responsive. The extractor 142 may further include a guardian 151. The guardian 151 may check periodically, such as every few seconds in one example, that the heartbeat 150 has indicated a responsive mail server 130. In the event the heartbeat 150 indicates the mail server 130 is unresponsive, or has been unresponsive for longer than a threshold time, the guardian 151 may stop other components of the extractor 142 and attempt to restart the extractor 142, e.g. by relaunching other portions of the extractor 142. The extractor 142 may include a coordinator 152. The coordinator 152 may generate (e.g. launch or start) migrators 153. Accordingly the extractor 142 may further include migrators 153. Any number of migrators 153 may be provided in the extractor 142, and generally in some examples each migrator 153 may serve to migrate one mailbox. Accordingly, if the extractor may migrate up to a maximum number of mailboxes, it may be provided with up to that same maximum number of migrators in some examples.

Mailbox users 157 may communicate with the mail server 130 and or/the mail client 135 directly or over the mail system network 140. The mailbox users 157 may be individuals or may be other computer processes that utilize mailboxes. One or more administrators 158 may communicate with the mail server 130 and/or mail client 135 directly or over the mail system network 140. The administrators 158 may be individuals or may be other computer processes used to administer the mail server 130 and/or mail client 135. The administrators 158 may utilize another computing system (not shown) to access the mail server 130 and/or mail client 135 or the administrators may directly utilize the mail server 130 and/or mail client 135 computing systems to administer the systems. The administrators 158 may further communicate with the software hosting system 115, for example to initiate a request for a software service and/or provide configuration information for the software service.

The software hosting system 115 may provide software services to client systems, such as the source messaging system 105. In the example of FIG. 1, the software hosting system 115 is programmed to provide mailbox migration services, but other software services may be provided by software hosting systems utilizing the communication techniques for connection to client systems described herein. The software hosting system 115 includes a migration website 160, a migration web API 162, a migration scheduler 163, a migration service 164, and a communication service 165. These may all be implemented as software components that are programmed on the software hosting system 115 to provide the functionalities and interactions described herein.

The migration website 160 may provide a web interface for receipt of a request for software services provided by the software hosting system 115. For example, the migration website 160 may receive a request to start a mailbox migration from the source system 105 to the destination messaging system 110. The migration website 160 may start the requested migration, including communicating with the migration scheduler 163 to begin a migration. The migration web API 162 may check periodically, e.g. every 30 seconds in one embodiment, to determine if a software service, e.g. a mailbox migration, has been requested. The migration scheduler 163 may identify computing resources for the software hosting system 115 to utilize in providing the requested software service. For example, the migration scheduler 163 may associate particular servers to a requested migration. In other examples, the migration scheduler 163 may dynamically obtain computing resources, for example, from a cloud provider, to perform the requested service. Embodiments of dynamically obtaining and assigning resources for mailbox migrations are described in co-pending U.S. Published Patent Application 2011/0264748, entitled "On-demand mailbox synchronization and migration system," published on Oct. 27, 2011 from application Ser. No. 12/961,268, filed on Dec. 6, 2010 and claiming priority to provisional application No. 61/328,001 The entire contents of LS. Published Application 2011/0264748, U.S. Ser. No. 12/961,268, and provisional application Ser. No. 61/328,003, are hereby incorporated by reference in their entirety for any purpose.

The communication service 165 may open a communication channel to the source messaging system 105, e.g. for communication with the extractor 142. In some examples, one communication channel may be opened for each migrator 153 provided in the source messaging system 105. The communication service 165 may be implemented using communication frameworks, such as but not limited to Microsoft's Windows Communication Framework (WCF). Accordingly, the communication service 164 may facilitate the receipt of data from the source messaging system 105 and the providing of actions to the source messaging system 105 for the source messaging system 105 to perform.

The migration service 164 may generally perform the mailbox migration. For example, the migration service 164 may receive data obtained from the source messaging system 105 (e.g. through the extractor 142) and may send the data to the destination messaging system 110. The migration service 164 may perform a conversion (e.g. translation) of the data obtained from the source messaging system 105 from a format used by the source messaging system 105 to a format used by the destination messaging system 110 (e.g. Lotus Notes to Gmail, etc.). The migration service 164 may maintain a list of actions for performing a mailbox migration and may provide next actions for sending to the source messaging system 105.

The software hosting system 115 may include an action buffer 170 and a data buffer 171. Any number of action buffers and data buffers may be included in the software hosting system 115, with generally one action buffer and data buffer provided per mailbox migration. The action buffer 170 and data buffer 171 may be implemented in memory (the two buffers may be implemented in the same or different memories) accessible to the software hosting system 115. The action buffer 170 may store one or more actions to be provided to the source messaging system 105 (e.g. to the extractor 142) for the source messaging system 105 to act on a migration. For example, actions may include test, wait, stop, done, get items, and may include one or more parameters related to the action.

The data buffer 171 may store data, e.g. messaging system content, received from the source messaging system 105. The migration service 164 may access data in the data buffer 171 and provide the data to the destination messaging system 110.

Figure 2:
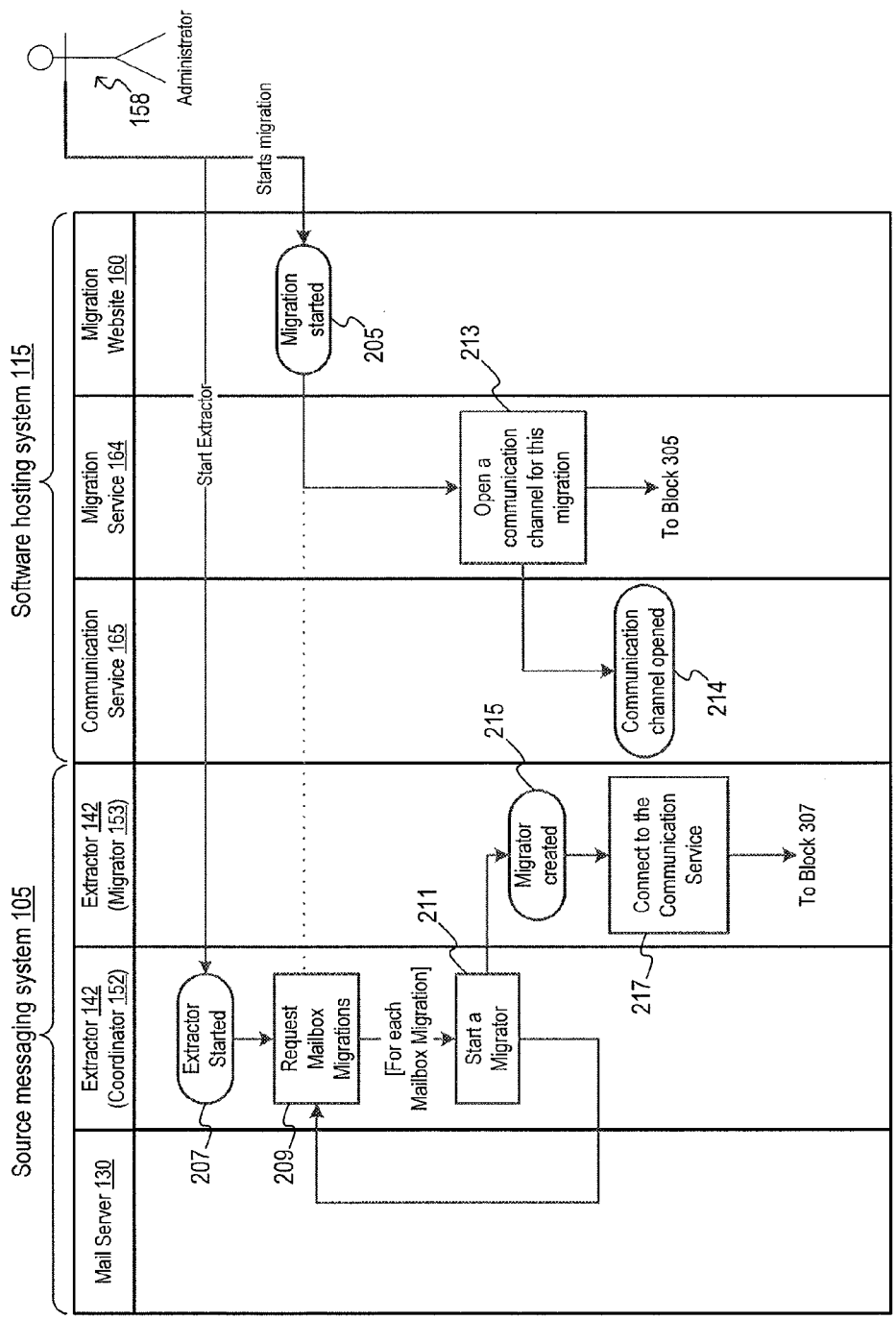
FIGS. 2 and 3 are a flowchart illustrating actions to be performed by components of a system in accordance with an embodiment of the present invention.
Figure 3:
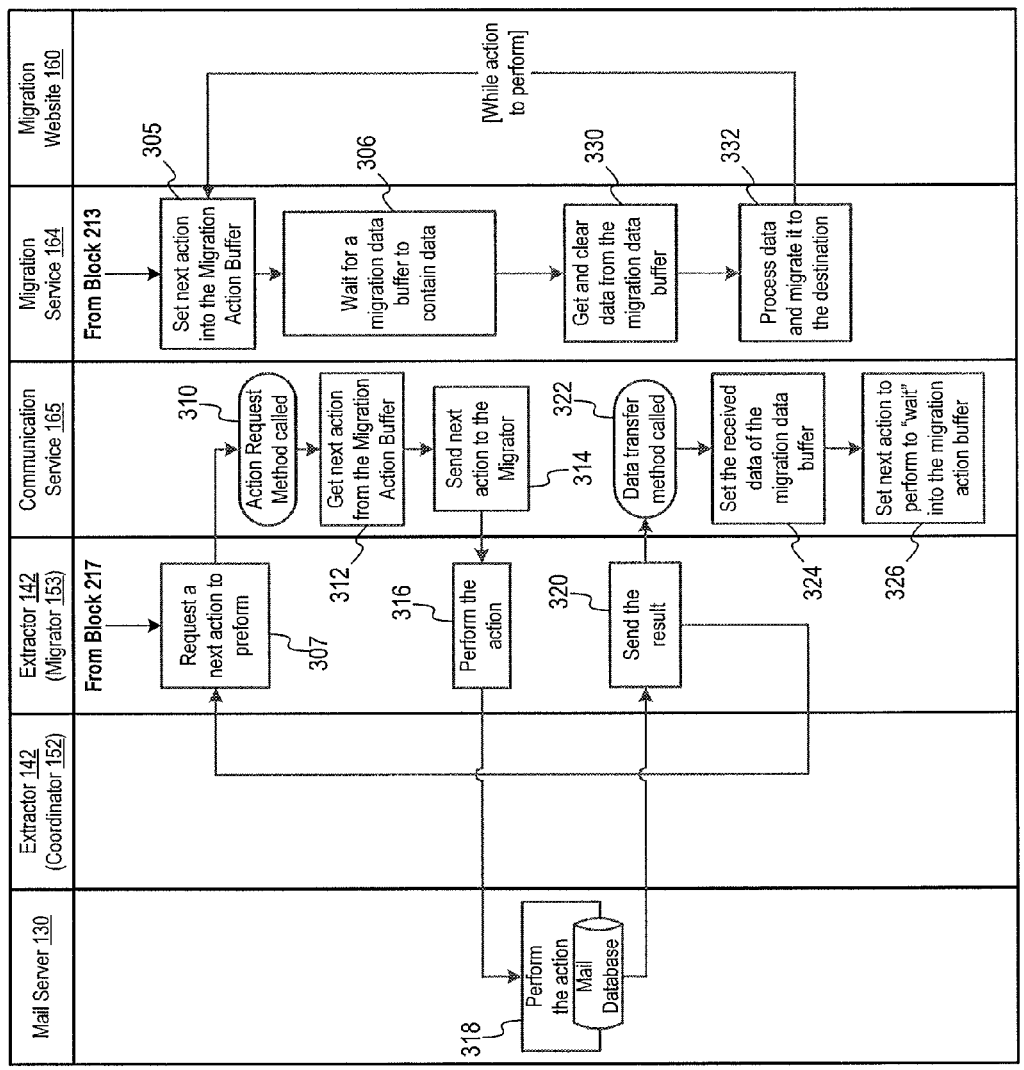

FIGS. 2 and 3 are flowcharts illustrating actions to be performed by components of a system in accordance with an embodiment of the present invention. Components of the source messaging system 105 and the software hosting system 115 are shown with like reference numbers to those of FIG. 1. Columns are shown to illustrate the actions performed by the mail server 105, coordinator 152 portion of the extractor 142, migrator 153 portion of the extractor 142, communication service 165, migration service 164, and migration website 160. An administrator 158 may start a migration in block 205 using the migration website 160. Starting a migration may include indicating a source messaging system, a destination messaging system, a number of mailboxes to migrate, and in some examples may include providing credentials for access to the mailboxes for which migration is requested. Once a migration is started in block 205, the migration service 164 may open a communication channel for the migration in box 213. The communication channel may be specific to the migration (e.g. may be specific to one mailbox). Accordingly, a communication channel may be opened by the migration service 164 for each mailbox to be migrated. The communication channel is accordingly shown open in block 214.

The administrator 158, or in other examples a different person or electronic process, may start an extractor on the source messaging system 105, such as the extractor 142 of FIG. 1. The extractor may be started, for example, by launching an executable containing the computer executable instructions for performing the extractor functionalities. Accordingly, an executable file for the extractor 142 may be provided to the administrator 158 or otherwise loaded onto the client messaging system 105. The extractor may be started in box 207. The coordinator 152 may, in box 209, request mailbox migrations to be performed. For example, the source messaging system 105 may not be aware that a mailbox migration has been requested or is desired for the source messaging system 105. The coordinator 152 may periodically communicate with the software hosting system 115 to determine if a mailbox migration has been started. When the coordinator 152 determines that a mailbox migration has been started, in box 211, the coordinator may start a migrator, such as the migrator 153. A migrator 153 may be started for each mailbox migration requested.

A migrator may accordingly be created in block 215. In block 217, the migrator may connect to the communication service, e.g. the communication service 165 of FIG. 1. In some examples, the migrator may periodically attempt to connect to the communication service. For example, in some embodiments the migrator may be started in block 215 prior to the communication channel being opened in block 213. Accordingly, the migrator may need to make several attempts to connect to the communication service in block 217.

Referring now to FIG. 3, the migration service 164 may set a next action in a migration action buffer in block 305. The migration service 164 may maintain a list of actions that may be required in a migration, and an order in which the actions are to be performed. A next action may be placed in the action buffer in the block 305. The migration service 164 may then wait for a migration data buffer to contain data in block 306. The extractor 142, once connected to the communication service in block 217, may request a next action to perform. To request a next action, the extractor may call the communication service 165 in block 310. The extractor 142 may call a method supported by the communication service, e.g. 'Action Request.' Communication between the extractor 142 and the communication service 165 may occur using HTTP through a firewall in some examples, a standard configuration for http traffic.

The communication service 165 may receive a next action from the action buffer in block 312. For example, responsive to the 'Action Request' call received from the extractor 142 in block 310, the communication service 165 may get a next action stored in the action buffer, e.g. an action set in the action buffer in the block 305. In block 314, the communication service 165 may provide the next action to the migrator 153. The migrator 153 may accordingly perform the action in block 316. The migrator 153 may, for example, communicate with the mail server 105 to perform the action in block 318, such as getting messaging system content. Communication between the extractor 142, including the migrator 153, and the mail server 105 may be behind a firewall on a mail system network, as shown in FIG. 1.

Referring again to FIG. 3, results of the action may be sent by the migrator 153 to the communication service in block 320. For example, the migrator 153 may call a method supported by the communication service 165, e.g. a 'Data Transfer' method in block 322. After sending the result in block 320, the migrator 153 may request a next action to perform in block 307. Accordingly, the migrator 153 may repeatedly request an action from the communication service 165, perform the action, and send results. When the action received is indicative of stopping the migration (e.g. a done action), the migrator 153 may close, such that computing resources dedicated to the migrator 153 may become available to other programs on the computing system on which the migrator 153 resided. For example, the computing resources may be used to start other migrators for other requested migrations.

After the 'Data Transfer' method is called in block 322, the communication service 165 may receive data from the migrator 153 responsive to the action performed, and may set the received data in the data buffer in block 324. The communication service 165 may in block 326 set a next action in the action buffer to 'wait'. In this manner, should the migrator 153 request a next action prior to the software hosting system 115 processing the received data, the migrator 153 would receive a wait action responsive to requesting the next action in block 307. Accordingly, the migrator 153 may wait to perform another action involving the mail server 105 until the data set in the data buffer has been cleared from the data buffer—e.g. has been migrated by the migration service 164, or moved out of the data buffer to another location in memory accessible to the software hosting system in preparation for migration by the migration service 164.

Following data set in the data buffer in block 324, the migration service 164 may identify the data buffer contains data in block 306, and in block 330, the migration service 164 may get and clear data from the data buffer. For example, data may be moved out of the data buffer in block 330 and read into or moved to another memory or memory area accessible to the migration service 164. The memory to which the data is moved may be located on the same physical memory (e.g. hard drive) as the data buffer in some examples, but not logically part of the data buffer. In block 332, the data from the data buffer, either stored in the data buffer or in another location having been moved from the data buffer, may be migrated to a destination messaging system. Once the data is moved out of the data buffer, the migration service 164 may then set a next action into the action buffer in block 305.

In this manner, examples of the present invention may control mailbox migrations utilizing an action buffer storing a net action, and a data buffer storing data received from a source messaging system. Communication between the source messaging system 105 and the software hosting system 115 may be performed through a firewall using HTTP in some examples and the software hosting system 115 may not directly access a mail server 105. Instead, the source message system 105 may obtain next actions from the software hosting system 115, connect with the mail server 130 to perform actions, and provide data back to the software hosting system 115, which may migrate the data to the destination messaging system.

Figure 4:
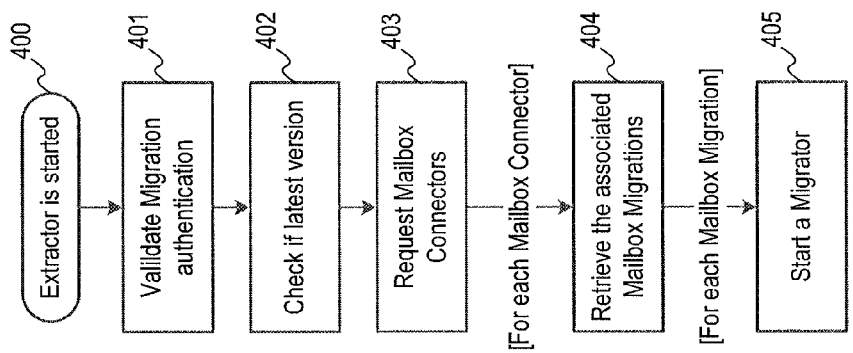
FIG. 4 is a flowchart of operations to start migrators and assign mailboxes to migrators arranged in accordance with an embodiment of the present invention.

FIG. 4 is a flowchart of operations to start migrators and assign mailboxes to migrators arranged in accordance with an embodiment of the present invention. An extractor may be started in block 400. In some examples, the extractor may already be provided on a client system, e.g. a source messaging system such as the source messaging system 105 of FIG. 1. In other examples, an administrator or other person or process may install an extractor, e.g. by launching an executable file having computer readable instructions to program the source messaging system to perform the extractor functions described herein.

In block 401, the extractor, e.g. the extractor 142 of FIG. 1, may validate a migration authentication. Block 401 may be performed by the coordinator 152 of FIG. 1. The coordinator 152 may authenticate itself to the software hosting system 115, for example. In block 402, the extractor may check that it is operating with a latest version of the extractor software. For example, the coordinator 152 of FIG. 1 may request a version check from the software hosting system 115, and if not operating at the latest version, may obtain a latest version of the extractor from the software hosting system 115. The coordinator 152 of FIG. 1 may perform block 402 in some examples.

In block 403, mailbox connectors may be requested. Each mailbox connector may specify a migration from one source messaging system to another source messaging system, e.g. "Lotus to GMail." The mailbox connectors may be specified by an administrator using the migration website 160 of FIG. 1 in some examples. The administrator may further associate mailboxes to the connector (e.g. specify all of the mailboxes that should be migrated from the source to the destination messaging system). Accordingly, in block 403, the coordinator 152 of FIG. 1 may request from the software hosting system all the mailbox connectors which pertain to the source messaging system with which the coordinator 152 is associated, e.g. the source messaging system 105. For each connector involving the source messaging system 105, in block 404, the coordinator 152 may retrieve the associated mailbox migrations. For example, each individual mailbox to be migrated may be considered a separate mailbox migration. For each mailbox migration, a migrator may be started in block 405. The coordinator 152 of FIG. 1 may perform the blocks 404 and 405, and may start the migrators 153 in block 405. As has been described above, each extractor may have any number of migrators, and may in some examples have up to a maximum amount of migrators to ensure the migrators do not exceed available computational resources. In examples where the number of mailbox migrations retrieved in block 404 exceeds the maximum number of migrators for a single extractor, additional extractors may be provided. In some examples, one extractor may only be able to run a maximum number of migrators. Multiple extractors may be installed on a machine (e.g. in several different folders), but this may result in a decrease in performance as the multiple extractors may compete for the same processing resources. Accordingly, in some examples, one extractor may be installed per machine, and multiple machines may be provided to provide a desired number of migrators, where the number of extractors desired may equal the number of mailboxes to be migrated simultaneously divided by the maximum number of migrators supported by an extractor. In other examples, a fewer number of extractors may be used and the mailbox migration may take a longer time to run while the fewer number of migrators each provide a number of migrators equal or less than the maximum number they may support. The blocks in FIG. 4 may be repeated until a user, administrator, or other individual or process closes the extractor.

Figure 5:
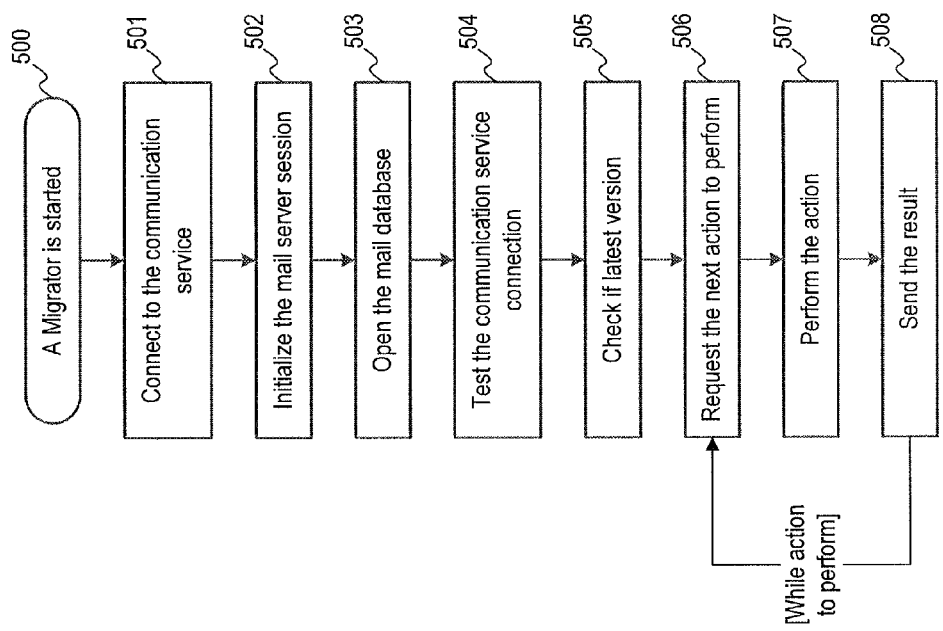
FIG. 5 is a flowchart of operations for a migrator to request a next action and provide data to a software hosting system in accordance with an embodiment of the present invention.

FIG. 5 is a flowchart of operations for a migrator to request a next action and provide data to a software hosting system in accordance with an embodiment of the present invention. The actions shown in FIG. 5 may be performed by a migrator, e.g. one of the migrators 153 of FIG. 1, in some examples. In block 500, a migrator may be started. Recall, for example, a migrator may be started by a coordinator, e.g. coordinator 152 of FIG. 1, responsive to an indication a mailbox migration has been requested. One migrator may be started for each mailbox to be migrated. In block 501, the migrator may connect to the software hosting system. For example, the migrator 153 of FIG. 1 may connect to the communication service 165. Communication may occur, for example through a firewall using HTTP in some examples.

In block 502, the migrator may initialize a mail server session, for example a Lotus Notes session. Referring back to FIG. 1, the migrator 153 may initialize a mail session with the mail server 130. Accordingly, the mail session allowing access to the mail database 131 may be initiated over the mail system network 140 or through a direct connection between the migrator 153 and the mail server 130. The mail session may not be initialized using the network 125 in some examples. Accordingly, the mail server 130 itself may not need to communicate over the network 125 in some examples. Referring again to FIG. 5, in block 503, the mail database is opened. The mail database may be opened by the migrator or by the mail server. In some examples, the entire database may not be opened or accessible, but rather the portion of the database corresponding with the mailbox to be migrated by the migrator initializing the mail server connection. Accordingly, the mail database, such as the database 131 of FIG. 1, and/or relevant portions of the database, may now be accessible to the migrator, including the messaging system content stored on the mail database.

In block 504, the migrator may optionally test the connection to the communication service. The test may be conducted, for example, by sending a test message and receiving a known reply from the software hosting service in response. In block 505, the migrator may optionally check with the software hosting service to ensure it is running the latest version of the migrator and/or extractor software. If a more recent version or update is available, the update may be installed before the mailbox migration is begun.

In block 506, the migrator may request a next action to perform. The next action to perform may, for example, be requested by the migrator 135 of FIG. 1 from the communication service 165 of FIG. 1. The communication service 165 may obtain the next action to perform from the action buffer 170 of FIG. 1 and provide the action to the migrator 135.

Referring again to FIG. 5, in block 507, the migrator may perform the action received responsive to the request in block 506. For example, the migrator may wait, or may request data from the mail server. In some example, the action received may specify how much data should be retrieved corresponding to the one action. It may be desirable not to retrieve large amounts of data responsive to a single action, because the retrieving of larger amounts of data may be more prone to failure. Accordingly, in some examples, an action is associated with a maximum amount of data to retrieve, or a number of content items to retrieve, 1000 content items is one example.

In block 508, the result, if any, from performing the action may be sent back to the software hosting system. For example, the migrator 153 of FIG. 1 may send the result of an action, e.g. messaging system content retrieval, to the communication service 165. The communication service 165 may store the received data in the data buffer 171. Referring again to FIG. 5, the blocks 506-508 may be repeated until an action indicating the mailbox migration is complete or is to be stopped is received—e.g. an action 'done' or 'stop'.

Figure 6:
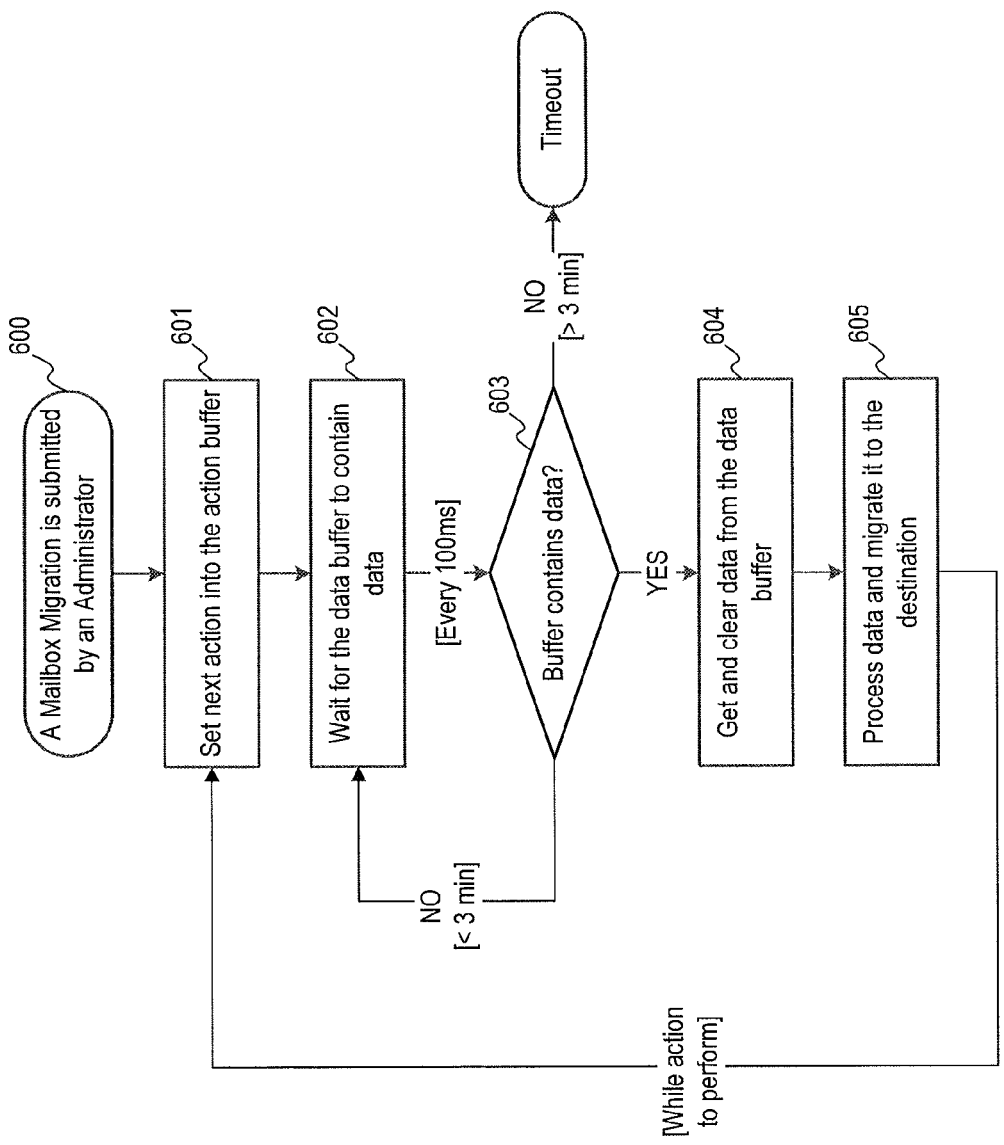
FIG. 6 is a flowchart illustrating operations performed by a software hosting system responsive to initiation of a mailbox migration.

FIG. 6 is a flowchart illustrating operations performed by a software hosting system responsive to initiation of a mailbox migration. A software hosting system in examples of the present invention may execute a series of actions to retrieve messaging system content for migration. Because the source messaging system may not be accessible over the Internet in examples of the present invention, actions may be stored (e.g. deposited, set) in an action buffer and recovered and performed by a migrator running in the source messaging system.

In block 600, a mailbox migration may be requested by an administrator. The mailbox migration may be requested, for example, using the migration website 160 of FIG. 1. In requesting a mailbox migration, an administrator may specify a source messaging system, a destination messaging system, mailboxes to be migrated, authentication credentials for the mailboxes, or combinations thereof.

In block 601, the software hosting system may set a next action into an action buffer. For example, the migration service 164 of FIG. 1 may set the next action into an action buffer. The action buffer into which the migration service may set the next action may be an action buffer accessible to a migrator running on a source messaging system through the communication service of FIG. 1.

Unlike a classic call to a web service, the software hosting system in examples of the present invention may not be informed of the outcome of the next action. For example, in the case of a web service call, the calling system may be informed of the outcome of a requested action, and if the action was successful, the calling system may receive the requested data and continue processing. Because the source messaging system in examples of the present invention may not be accessible using a web service call, however, in embodiments of the present invention a different approach may be taken to inform the software hosting system of a completed action.

In block 602, the software hosting system (e.g. the migration service 164 of FIG. 1) may wait for a data buffer (e.g. the data buffer 171 of FIG. 1) to contain data. Recall as described above with reference to FIGS. 3 and 5, data provided from the source messaging system responsive to an action may be stored in the data buffer. Accordingly, the migration service 164, which may not know when or if the action in the action buffer was received by the source messaging system or if the action was successful, may wait for data to be present in the data buffer. In some examples, the migration service 164 may check the data buffer periodically in block 603 (e.g. every 100 ms in the example of FIG. 6—other frequencies may be used in other examples). If no data is present after a maximum amount of time in some examples (e.g. three minutes in the example of FIG. 6, other maximum times may be used in other examples), the migration service may time out.

If data is found by the migration service in the data buffer, the migration service in block 604 may retrieve and clear the data from the data buffer. For example, the migration service may read the data in the data buffer and/or copy the data from the data buffer to another location accessible to the migration service. The migration service may delete the data from the data buffer. Clearing (e.g. deleting) data from the data buffer may serve as an acknowledgement of receipt of the data by the migration service. In this manner, the communication service may be able to provide an indication to the source messaging system that the data has been received. In block 605, the migration service may process the data and may migrate the data to the destination messaging system.

If there are still actions to perform in the migration, the migration service may continue again at block 601 by placing a next action in the action buffer.

Figure 7:
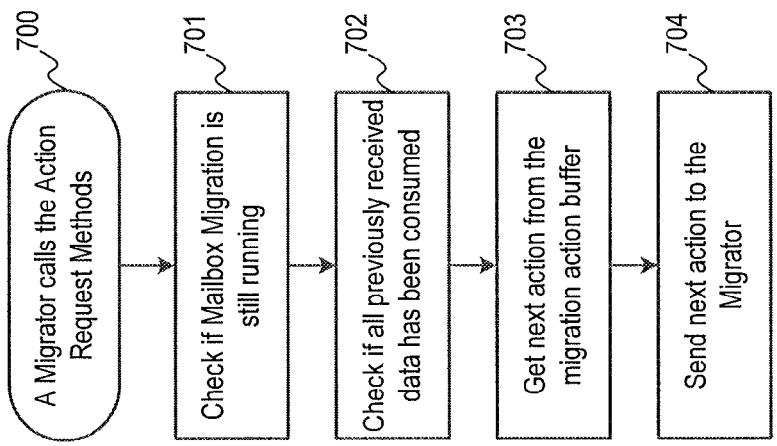
FIG. 7 is a flowchart of operations performed by a communication service in examples of the present invention responsive to an action request call.

FIG. 7 is a flowchart of operations performed by a communication service in examples of the present invention responsive to an action request call. In block 700, a migrator (e.g. the migrator 153 of FIG. 1), may call an action request method supported by a communication service (e.g. the communication service 165 of FIG. 1). The migrator may call the action request method when it is ready for a next action (e.g. in block 307 of FIG. 3).

In block 701, the communication service may verify that the mailbox migration associated with the migrator making the call is still in progress. For example, the communication service may check that there is an action in the action buffer associated with the migrator making the call. If no action is contained in the action buffer, the communication service may return a stop action in order to inform the migrator that the mailbox migration is complete or has been stopped.

In block 702, the communication service may check that previously received data has been cleared from the data buffer. If the data buffer contains data, the communication service may return the action 'wait' to the migrator, indicating to the migrator that the migrator should request an action later. This may allow sufficient time for the migration service to process (e.g. copy and/or begin migrating) the data in the data buffer. The communication service needs not wait in some examples until the data has been fully migrated (e.g. transferred to the destination messaging system), instead the communication service may wait for the data to be copied out of the data buffer to another storage location accessible to the migration service from which the migration service may complete the migration. In examples of systems and methods described herein, data may be downloaded from the source messaging system generally at a faster rate than the data is migrated and uploaded at the destination messaging system which may result in accumulation of data in the software hosting system during a migration. For example, if a wait were not returned while data were still present in the data buffer, data may back up in the data buffer and/or software hosting system. Accordingly, the wait may improve performance by ensuring that a data backlog may not be created while the migration service is processing data.

In block 703, the communication service may get the next action from the action buffer. For example, the communication service may read the next action in the action buffer. In some examples, the communication service may then delete the action from the action buffer. In block 704, the communication service may send the next action to the migrator. Communication may occur, for example, through a firewall using HTTP.

Figure 8:
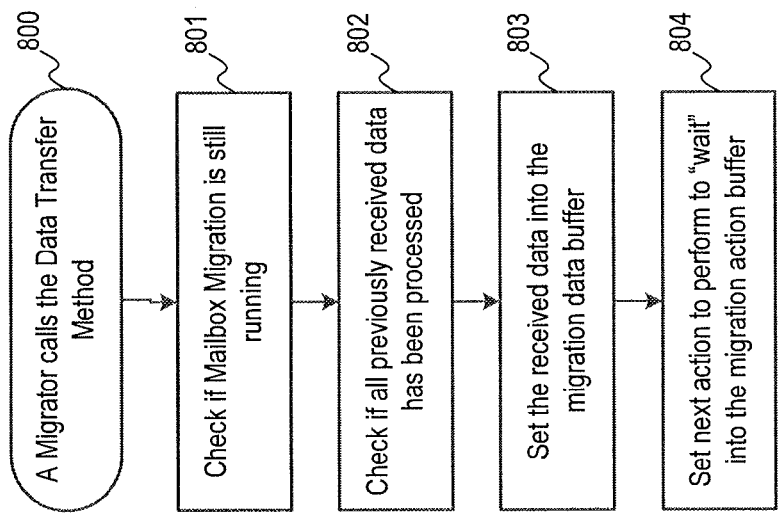
FIG. 8 is a flowchart of operations for retrieving data and transmitting the data to a software hosting system in accordance with an embodiment of the present invention.

FIG. 8 is a flowchart of operations for retrieving data and transmitting the data to a software hosting system in accordance with an embodiment of the present invention. In block 800, a migrator (e.g. the migrator 153 of FIG. 1) may call a data transfer method of a communication service (e.g. the communication service 165 of FIG. 1). For example, the data transfer method is called in block 322 of FIG. 3. In block 801, the communication service may check if the migration to which the data transfer call pertains is still running. For example, the communication service may check the action buffer associated with the migration, and if the action buffer contains an action, the communication service may determine the migration is still running. Moreover, the communication service may check the action buffer associated with the migration in some examples to determine if the action buffer contains an action that requested the data received in the method call. If the action buffer does contain an action that requested the data, the communication service may proceed. If, however, the action buffer does not contain an action, or in some examples if the action buffer does not contain an action which requested the received data, the communication service may reject the received data.

In block 802, the communication service may check if all previously received data has been processed. For example, the communication service may check if the data buffer associated with the migration still contains data. If the data buffer contains data, the incoming data may be rejected to allow time for the existing stored data to be processed. If the data buffer does not contain data, the process of FIG. 8 may continue.

In block 803, the communication service may store (e.g. set) the received data into the data buffer (for example, the communication service 165 of FIG. 1 may store received data in the data buffer 171 of FIG. 1). In block 804, the communication service may store (e.g. set) a next action in the action buffer to "wait". By storing a next action as wait in the action buffer, if a migrator calls the action request method of the communication service before the migration service has determined a next action, the migrator may receive a wait action.

Figure 9:
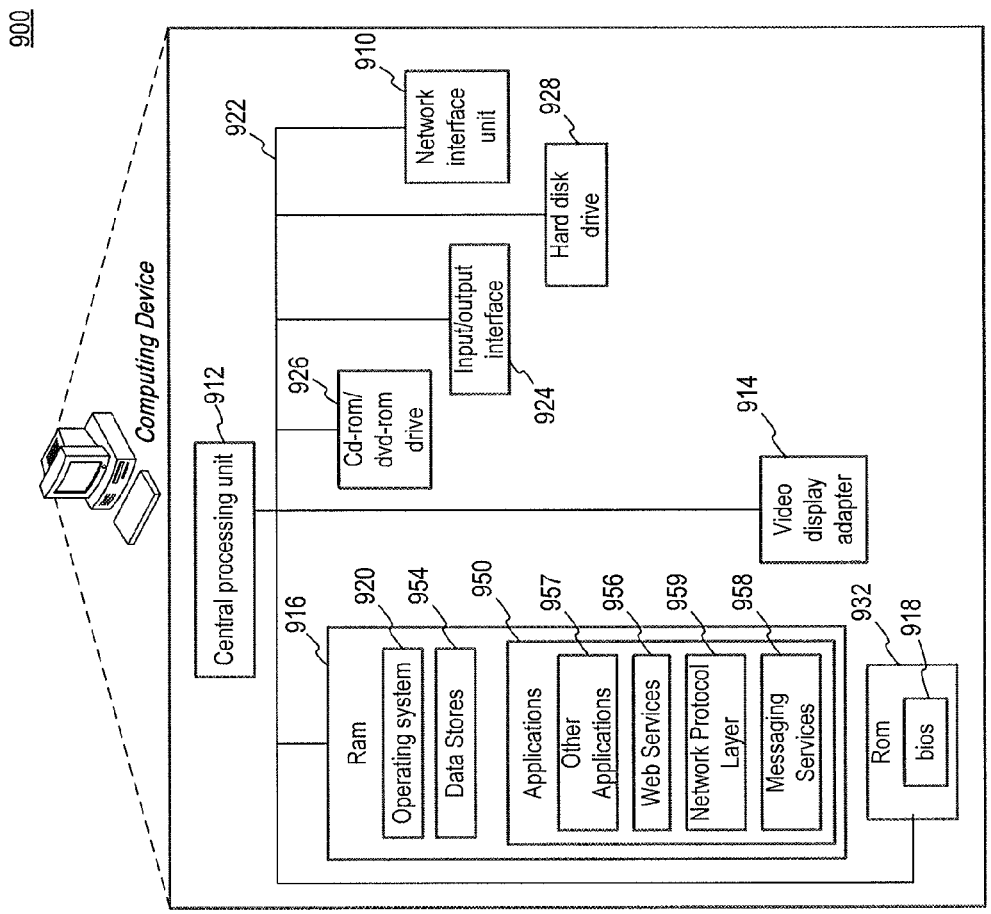
FIG. 9 is a schematic illustration of one example of a computing system according to one embodiment of the invention.

FIG. 9 is a schematic illustration of one example of a computing system according to one embodiment of the invention. The computing system 900 may be used to implement the software hosting system 115 of FIG. 1, the destination messaging system 110 of FIG. 1, or the source messaging system 105 in some examples. In other examples, the computing system 900 may include many more or less components than those shown. While the computing system 900 of FIG. 9 is shown as including a single computing device, in examples of the present invention the computing system 900 may include multiple computing devices which may be in communication with one another.

Computing system 900 includes processing unit 912 (additional processing units may be included in other embodiments), video display adapter 914, and a memory, all in communication with each other via bus 922. The memory generally includes RAM 916, ROM 932, and one or more permanent mass storage devices, such as hard disk drive 928, tape drive, optical drive, and/or floppy disk drive. The memory may store operating system 920 for controlling the operation of the computing system 900. Any general-purpose operating system may be employed. Basic input/output system ("BIOS") 918 may also be provided for controlling the low-level operation of computing system 900. As illustrated in FIG. 9, computing system 900 also can communicate with the Internet, or some other communications network, via network interface unit 910, which may be constructed for use with various communication protocols including the TCP/IP protocol, and/or through the use of Network Protocol Layer 959, or the like. Network interface unit 910 is sometimes known as a transceiver, transceiving device, or network interface card (NIC).

The memory as described above illustrates a type of computer-readable media, namely computer-readable storage media. Computer-readable storage media (e.g. devices) may include volatile, nonvolatile, removable, and non-removable media implemented in any method or technology for storage of information, such as computer readable instructions, computer executable instructions, data structures, program modules, or other data. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical, transitory, or non-transitory medium which can be used to store the desired information and which can be accessed by a computing device.

As shown, data stores 954 may include a database, text, spreadsheet, folder, file, or the like, that may be configured to maintain and/or store various content. Data stores 954 may further include program code, data, algorithms, and the like, for use by a processor, such as central processing unit (CPU) 912 to execute and perform actions. In one embodiment, at least some of data and/or instructions stored in data stores 954 might also be stored on another device of the computing system 900 or accessible to the computing system 900, including, but not limited to cd-rom/dvd-rom 926, hard disk drive 928, or other computer-readable storage device resident on the computing system 900 or accessible by the computing system 900 over, for example, network interface unit 910.

The memory may also store program code and data. One or more applications 950 may be loaded into memory (e.g. programmed) and run on operating system 920. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Web services 956, messaging services 958, and Network Protocol Layer 959, may also be included as application programs within applications 950. However, the invention is not limited to these non-limiting examples, and other applications may also be included. As has been described above, in some examples of the source messaging system 105 of FIG. 1 (e.g. Lotus Notes systems), the system may not include web services capabilities, or messaging services sufficient to call a web service.

Messaging services 958 may include virtually any computing component or components configured and arranged to forward messages from message user agents, and/or other message servers, or to deliver messages to a local message store, such as data store 954, or the like. Thus, messaging services 958 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, or the like. Messaging services 958 may be configured to manage SMS messages, IM, MMS, IRC, RSS feeds, mIRC, or any of a variety of other message types. In one embodiment, messaging services 958 may enable users to initiate and/or otherwise conduct chat sessions, VoIP sessions, or the like. However, in some examples, as described above, examples of source messaging systems described herein may not include messaging services for calling web services.

Network Protocol Layer 959 may represent those applications usable to provide communications rules and descriptions that enable communications in or between various computing devices. Such protocols, include, but are not limited to signaling, authentication, error detection and correction capabilities. In one embodiment, at least some of the applications for which Network Protocol Layer 959 represents may be included within operating system 920, and/or within network interface unit 910.

Accordingly, when used to implement the software hosting system 115 of FIG. 1, the memory (e.g. RAM 916) may be encoded with computer executable instructions (e.g. programmed) for performing the functions described for the migration website, migration web API, communication service, migration scheduler, and the migration service. The functions described with reference to those components may be performed in the network protocol layer 959. The memory (e.g. data stores 954) may store the action buffers and data buffers described above, e.g. the action buffer 170 and data buffer 171 of FIG. 1.

When used to implement the source messaging system 105 of FIG. 1, the memory (e.g. RAM 916) may be encoded with computer executable instructions (e.g. programmed) for performing the functions described for the extractor 142 of FIG. 1, including the heartbeat 150, guardian 151, coordinator 152, and migrator 153. As described above, the extractor executable instructions may be programmed on the source messaging system by an administrator launching an executable file on the source messaging system, which executable file is configured to program the source messaging system with the described functionalities.

From the foregoing it will be appreciated that, although specific embodiments of the invention have been described herein for purposes of illustration, various modifications may be made without deviating from the spirit and scope of the invention.

What is claimed is:

1. A software hosting system for performing mailbox migrations, the software hosting system comprising:
    at least one action buffer associated with a mailbox migration from a source messaging system to a destination messaging system, the at least one action buffer configured to store one or more actions to be provided to the source messaging system;
    at least one data buffer associated with the mailbox migration;
    at least one computing device programmed with a migration service and a communication service,
    wherein the migration service is configured to:
        open a communication channel with the source messaging system, the communication channel associated with the mailbox migration; and
        store, in the action buffer, a next action to be performed by the source messaging system for the mailbox migration;
    wherein the communication service is configured to communicate with the source messaging system over the communication channel, wherein, during the mailbox migration, the communication service is configured to:
        receive, from the source messaging system, a request for the next action to be performed by the source messaging system;
        read, from the action buffer, the next action to be performed by the source messaging system;
        provide, to the source messaging system, the next action to be performed by the source messaging system responsive to receiving, from the source messaging system, the request for the next action to be performed by the source messaging system;
        receive source messaging system content from the source messaging system responsive to the next action to be performed being performed by the source messaging system; and
        set the source messaging system content in the data buffer; and
    wherein the migration service is further configured to:
        receive, from the data buffer, the source messaging system content; and
        migrate the received source messaging system content to the destination messaging system.

2. The system of claim 1, wherein the communication channel comprises a communication channel through a firewall using HTTP.

3. The system of claim 1, wherein the source messaging system does not support web APIs.

4. The system of claim 1, wherein the source messaging system includes a database configured to store content of the source messaging system.

5. The system of claim 1, wherein the at least one computing device is further programmed with a web API configured to receive configuration information related to the mailbox migration including an identity of the source messaging system, an identity of the destination messaging system, a number of mailboxes for migration, and authentication parameters for the mailboxes.

6. The system of claim 1, wherein the system further includes a plurality of action buffers and a plurality of data buffers, each of the action and data buffers associated with a respective mailbox migration.

7. The system of claim 1, wherein the migration service is further configured to open a plurality of communication channels, wherein each of the communication channels is associated with a respective mailbox migration.

8. The system of claim 1, wherein the migration service is further configured to periodically check the data buffer for data.

9. The system of claim 1, wherein the migration service is further configured to time out responsive to data being other than present in the data buffer after a threshold amount of time.

10. The system of claim 1, wherein the migration service is further configured to acknowledge receipt of data in the data buffer.

11. The system of claim 10, wherein the migration service is further configured to clear the received data from the data buffer, thereby acknowledging receipt of the data in the data buffer.

12. The system of claim 1, wherein the communication service is further configured to check whether data has been cleared from the data buffer.

13. A method comprising:
    storing, in at least one action buffer associated with a mailbox migration from a source message system to a destination messaging system, one or more actions to be provided to the source messaging system;
    opening a communication channel with the source messaging system, the communication channel associated with the mailbox migration;
    storing, in the action buffer, a next action to be performed by the source messaging system for the mailbox migration;
    communicating with the source messaging system over the communication channel, and, during the mailbox migration:
        receiving, from the source messaging system, a request for the next action to be performed by the source messaging system;
        reading, from the action buffer, the next action to be performed by the source messaging system;
        providing, to the source messaging system, the next action to be performed by the source messaging system responsive to receiving, from the source messaging system, the request for the next action to be performed by the source messaging system;
        receiving source messaging system content from the source messaging system responsive to the next action to be performed being performed by the source messaging system; and setting the source messaging system content in at least one data buffer associated with the mailbox migration; and receiving, from the at least one data buffer, the source messaging system content; and migrating the received source messaging system content to the destination messaging system.

14. The method of claim 13, wherein the communication channel comprises a communication channel through a firewall using HTTP.

15. The method of claim 13, wherein the source messaging system does not support web APIs.

16. The method of claim 13, wherein the source messaging system includes a database configured to store content of the source messaging system.

17. The method of claim 13, further comprising receiving configuration information related to the mailbox migration including an identity of the source messaging system, an identity of the destination messaging system, a number of mailboxes for migration, and authentication parameters for the mailboxes.

18. The method of claim 13, further comprising opening a plurality of communication channels, wherein each of the communication channels is associated with a respective mailbox migration.

19. At least one non-transitory computer readable storage medium encoded with instructions which, when executed, cause at least one computing system to perform operations comprising:

storing, in at least one action buffer associated with a mailbox migration from a source message system to a destination messaging system, one or more actions to be provided to the source messaging system;

opening a communication channel with the source messaging system, the communication channel associated with the mailbox migration;

storing, in the action buffer, a next action to be performed by the source messaging system for the mailbox migration;

communicating with the source messaging system over the communication channel, and, during the mailbox migration:

receiving, from the source messaging system, a request for the next action to be performed by the source messaging system;

reading, from the action buffer, the next action to be performed by the source messaging system;

providing, to the source messaging system, the next action to be performed by the source messaging system responsive to receiving, from the source messaging system, the request for the next action to be performed by the source messaging system;

receiving source messaging system content from the source messaging system responsive to the next action to be performed being performed by the source messaging system; and setting the source messaging system content in at least one data buffer associated with the mailbox migration;

receiving, from the at least one data buffer, the source messaging system content; and migrating the received source messaging system content to the destination messaging system.

20. The at least one non-transitory computer readable storage medium of claim 19, wherein the communication channel comprises a communication channel through a firewall using HTTP.

21. The at least one non-transitory computer readable storage medium of claim 19, wherein the source messaging system does not support web APIs.

22. The at least one non-transitory computer readable storage medium of claim 19, wherein the source messaging system includes a database configured to store content of the source messaging system.

23. The at least one non-transitory computer readable storage medium of claim 19, wherein the operations further comprise receiving configuration information related to the mailbox migration including an identity of the source messaging system, an identity of the destination messaging system, a number of mailboxes for migration, and authentication parameters for the mailboxes.

24. The at least one non-transitory computer readable storage medium of claim 19, wherein the operations further comprise opening a plurality of communication channels, wherein each of the communication channels is associated with a respective mailbox migration.

* * * * *